US011889541B2

(12) United States Patent
Balasubramanian et al.

(10) Patent No.: US 11,889,541 B2
(45) Date of Patent: Jan. 30, 2024

(54) SUPERPOSITION TRANSMISSION OF SIDELINK AND UPLINK

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Montgomery, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/127,574

(22) Filed: Dec. 18, 2020

(65) Prior Publication Data

US 2021/0235461 A1 Jul. 29, 2021

Related U.S. Application Data

(60) Provisional application No. 62/965,756, filed on Jan. 24, 2020.

(51) Int. Cl.
*H04W 72/541* (2023.01)
*H04W 52/34* (2009.01)
(52) U.S. Cl.
CPC ....... *H04W 72/541* (2023.01); *H04W 52/346* (2013.01)
(58) Field of Classification Search
CPC ..... H04W 52/06; H04W 52/08; H04W 52/10; H04W 52/146; H04W 52/24; H04W 52/242; H04W 52/243; H04W 52/262; H04W 52/34; H04W 52/346; H04W 52/383; H04W 52/386; H04W 72/082; H04W 72/1278; H04W 72/14
See application file for complete search history.

(56) References Cited

U.S. PATENT DOCUMENTS

| 6,216,010 | B1 * | 4/2001 | Edwards | H04W 52/24 455/65 |
| 10,313,920 | B1 * | 6/2019 | Manchanda | H04W 28/0231 |
| 11,277,851 | B2 * | 3/2022 | Stefanatos | H04L 5/0094 |

(Continued)

OTHER PUBLICATIONS

International Search Report and Written Opinion—PCT/US2020/066427—ISA/EPO—dated Mar. 31, 2021.

*Primary Examiner* — Jay P Patel
(74) *Attorney, Agent, or Firm* — Loza & Loza, LLP

(57) ABSTRACT

Aspects relate to mechanisms for a wireless communication device to generate a superposition transmission of a sidelink signal to be transmitted to at least one receiving wireless communication device and an uplink signal to be transmitted to a base station. The wireless communication device may transmit the superposition transmission on resources allocated by the base station on a common carrier utilized for both sidelink and uplink transmissions. The superposition transmission includes a base layer corresponding to the uplink signal and an enhanced layer corresponding to the sidelink signal. The wireless communication device may further generate and transmit interference assistance information to the receiving wireless communication device for use by the receiving wireless communication device in canceling the base layer from the superposition transmission.

23 Claims, 17 Drawing Sheets

(56) References Cited

U.S. PATENT DOCUMENTS

| | | | | |
|---|---|---|---|---|
| 2004/0242161 | A1* | 12/2004 | Marinier | H04W 76/18 455/422.1 |
| 2011/0106952 | A1* | 5/2011 | Doppler | H04W 72/0406 709/226 |
| 2011/0159914 | A1* | 6/2011 | Chen | H04W 52/362 455/522 |
| 2012/0177089 | A1* | 7/2012 | Pelletier | H04B 7/0417 375/219 |
| 2013/0178221 | A1* | 7/2013 | Jung | H04W 52/146 455/450 |
| 2013/0308715 | A1* | 11/2013 | Nam | H04B 7/0634 375/267 |
| 2015/0049736 | A1* | 2/2015 | Liu | H04W 52/383 370/331 |
| 2015/0050929 | A1* | 2/2015 | Song | H04W 52/16 455/552.1 |
| 2015/0078270 | A1* | 3/2015 | Seo | H04W 52/383 370/329 |
| 2015/0110038 | A1* | 4/2015 | Yang | H04L 5/0007 370/329 |
| 2015/0173048 | A1* | 6/2015 | Seo | H04W 72/10 370/329 |
| 2016/0044653 | A1* | 2/2016 | Bagheri | H04W 72/1278 370/329 |
| 2016/0044707 | A1* | 2/2016 | Folke | H04W 28/0278 370/329 |
| 2016/0192420 | A1 | 6/2016 | Kim et al. | |
| 2016/0374068 | A1* | 12/2016 | Kim | H04W 76/14 |
| 2017/0048841 | A1* | 2/2017 | Hwang | H04L 27/3488 |
| 2017/0332365 | A1* | 11/2017 | Lin | H04W 72/0406 |
| 2018/0146500 | A1* | 5/2018 | Muraoka | H04W 24/02 |
| 2019/0068274 | A1 | 2/2019 | Han et al. | |
| 2019/0380132 | A1* | 12/2019 | Hu | H04W 4/46 |
| 2019/0394786 | A1* | 12/2019 | Parron | H04L 27/0006 |
| 2020/0029283 | A1 | 1/2020 | Lei et al. | |
| 2020/0053598 | A1* | 2/2020 | Muraoka | H04W 4/70 |
| 2020/0092845 | A1* | 3/2020 | Cai | H04W 68/02 |
| 2020/0275412 | A1* | 8/2020 | Kim | H04B 7/06954 |
| 2020/0336253 | A1* | 10/2020 | He | H04W 4/40 |
| 2021/0083828 | A1* | 3/2021 | Matsuda | H04L 27/26 |
| 2021/0091903 | A1* | 3/2021 | Taherzadeh Boroujeni | H04L 5/0051 |
| 2021/0144691 | A1* | 5/2021 | Balasubramanian | H04L 1/1864 |
| 2021/0184909 | A1* | 6/2021 | Han | H04W 88/04 |
| 2021/0282116 | A1* | 9/2021 | Balasubramanian | H04W 72/0406 |
| 2021/0282143 | A1* | 9/2021 | Lee | H04W 76/14 |
| 2021/0400692 | A1* | 12/2021 | Balasubramanian | H04L 1/0004 |
| 2021/0410084 | A1* | 12/2021 | Li | H04W 52/265 |
| 2022/0061030 | A1* | 2/2022 | Wu | H04W 52/383 |
| 2022/0256559 | A1* | 8/2022 | Ding | H04W 72/1205 |

* cited by examiner

SUPERPOSITION TRANSMISSION OF SIDELINK AND UPLINK

CROSS-REFERENCE TO RELATED APPLICATIONS

The present Application for Patent claims priority to and the benefit of U.S. Provisional Application No. 62/965,756, titled "SUPERPOSITION TRANSMISSION OF SIDELINK AND UPLINK" filed Jan. 24, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to performing concurrent sidelink and uplink communication.

INTRODUCTION

In many existing wireless communication systems, a cellular network is implemented by enabling wireless communication devices to communicate with one another through signaling with a nearby base station or cell. As a wireless communication device moves across the service area, handovers take place such that each wireless communication device maintains communication with one another via its respective cell.

Another scheme for a wireless communication system is a device to device (D2D) network, in which wireless communication devices may signal one another directly, rather than via an intermediary base station or cell. D2D communication networks may utilize sidelink signaling to facilitate direct communication between wireless communication devices over a proximity service (ProSe) PC5 interface. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of sidelink wireless communication at a first wireless communication device is disclosed. The method includes communicating with a base station over a first link and a second wireless communication device over a second link on a common carrier shared between the first link and the second link and receiving a grant from the base station including an indication of resources on the common carrier for a superposition transmission including a base layer corresponding to an uplink signal to be transmitted to the base station and an enhanced layer corresponding to a sidelink signal to be transmitted to at least the second wireless communication device. The method further includes transmitting interference assistance information associated with the base layer to the second wireless communication device and transmitting the superposition transmission including the base layer and the enhanced layer to the base station and the second wireless communication device.

Another example provides a method of sidelink wireless communication at a first wireless communication device. The method includes communicating with a base station over a first link and a second wireless communication device over a second link on a common carrier shared between the first link and the second link, and receiving a superposition transmission from the second wireless communication device including a base layer corresponding to an uplink signal transmitted from the second wireless communication device to the base station and an enhanced layer corresponding to a sidelink signal transmitted from the second wireless communication device to the first wireless communication device. The method further includes receiving interference assistance information associated with the base layer from the second wireless communication device, and canceling the base layer from the superposition transmission utilizing the interference assistance information to obtain the enhanced layer including the sidelink signal.

Another example provides a method of wireless communication at a base station. The method includes communicating with a first wireless communication device over a first link on a common carrier shared between the first link and a second link on which the first wireless communication device further communicates with a second wireless communication device. The method further includes transmitting a grant to the first wireless communication device including an indication of resources on the common carrier for a superposition transmission including a base layer corresponding to an uplink signal to be transmitted from the first wireless communication device to the base station and an enhanced layer corresponding to a sidelink signal to be transmitted from the first wireless communication device to at least the second wireless communication device, and receiving the base layer of the superposition transmission including the uplink signal from the first wireless communication device.

Another example provides a first wireless communication device in a wireless communication network. The first wireless communication device includes a wireless transceiver, a memory, and a processor coupled to the wireless transceiver and the memory. The processor and the memory can be configured to communicate with a base station over a first link and a second wireless communication device over a second link on a common carrier shared between the first link and the second link via the wireless transceiver and receive a grant from the base station including an indication of resources on the common carrier for a superposition transmission including a base layer corresponding to an uplink signal to be transmitted to the base station and an enhanced layer corresponding to a sidelink signal to be transmitted to at least the second wireless communication device. The processor and the memory can further be configured to transmit interference assistance information associated with the base layer to the second wireless communication device via the wireless transceiver, and transmit the superposition transmission including the base layer and the enhanced layer to the base station and the second wireless communication device via the wireless transceiver.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
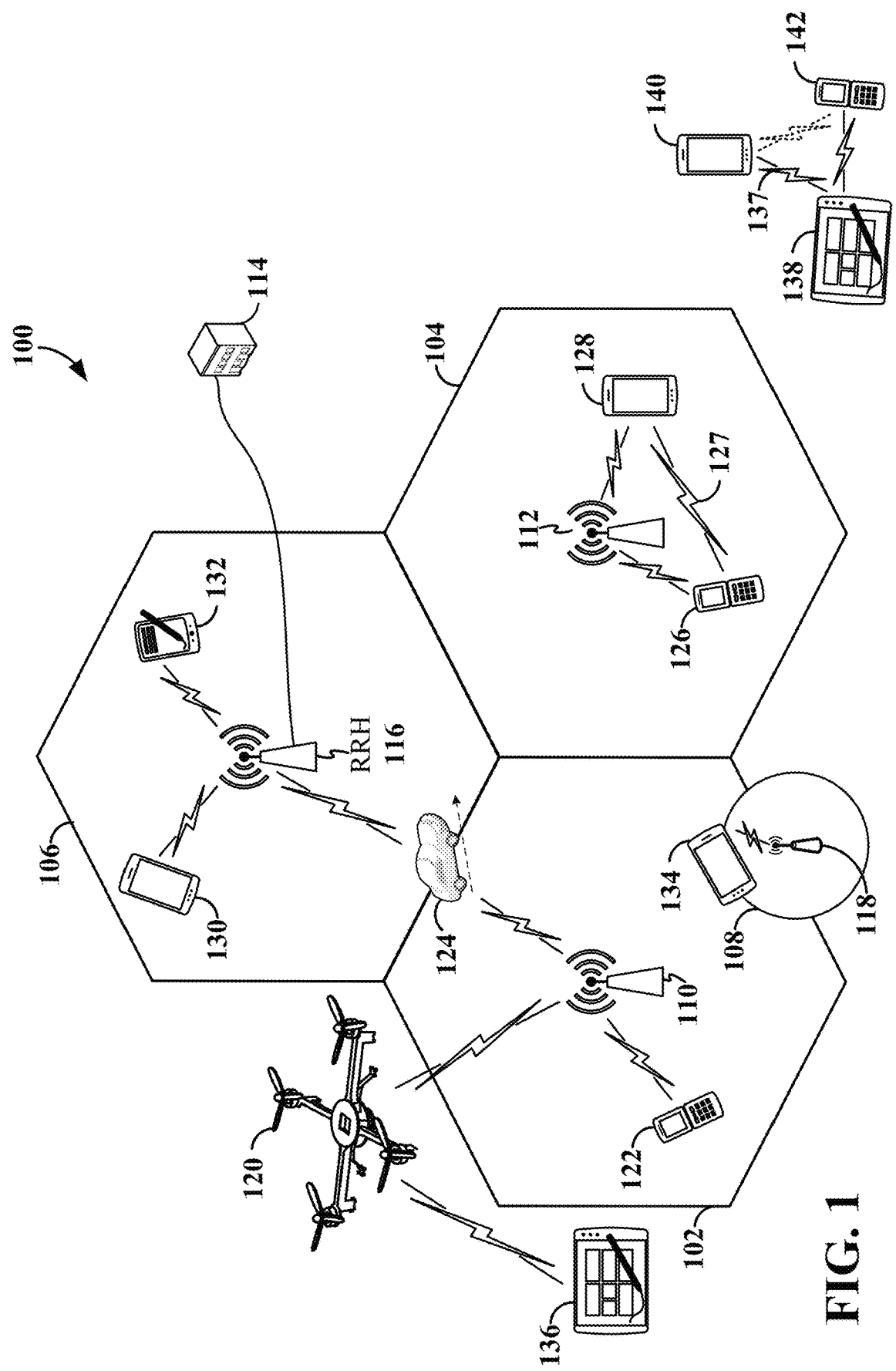
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for a wireless communication device to generate a superposition transmission of a sidelink signal to be transmitted to at least one receiving wireless communication device and an uplink signal to be transmitted to a base station. The wireless communication device may transmit the superposition transmission on resources allocated by the base station on a common carrier utilized for both sidelink and uplink transmissions. The superposition transmission includes a base layer corresponding to the uplink signal and an enhanced layer corresponding to the sidelink signal. The wireless communication device may further generate and transmit interference assistance information to the at least one receiving wireless communication device for use by the receiving wireless communication device in canceling the base layer from the superposition transmission.

In some examples, the base station may further determine a power split factor for the base layer and the enhanced layer and transmit the power split factor to the wireless communication device. The wireless communication device may apply the power split factor to a total power budget of the wireless communication device to generate the base layer at a first power and the enhanced layer at a second power. In some examples, the base station may further determine closed loop power control parameters and open loop power control parameters for the wireless communication device and transmit the closed and open loop power control parameters to the wireless communication device for use in determining the total power budget. In some examples, the base station may identify the power split factor based on an uplink quality (e.g., a path loss experienced by the wireless communication on the Uu (cellular) link between the base station and the wireless communication device) and a sidelink quality (e.g., a path loss experienced by the wireless communication device on the PC5 link). The wireless communication device may measure the sidelink path loss over a window of time and provide an average sidelink path loss over the window of time to the base station.

In some examples, the wireless communication device may receive a respective modulation and coding scheme (MCS) from the base station for use in generating each of the uplink signal and the sidelink signal. The wireless communication device may then include the MCS of the uplink signal and the power split factor in the interference assistance information to the receiving wireless communication device to enable the receiving wireless communication device to cancel the uplink signal from the received superposition transmission. In some examples, the interference assistance information may be transmitted within sidelink control information (SCI) or separate from the SCI.

In some examples, the wireless communication device may transmit a scheduling request requesting a grant of the resources on the common carrier for the superposition transmission. In other examples, the wireless communication device may transmit a scheduling request requesting a sidelink grant for the sidelink signal and the base station may determine to provide a superposition grant for the sidelink signal and an uplink signal (e.g., already configured or separately requested by the wireless communication device). For example, the wireless communication device may transmit a capability indication to the base station indicating a capability of the wireless communication device to perform the superposition transmission and the base station may provide the grant for the superposition transmission based on the capability indication.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd. Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell.

The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
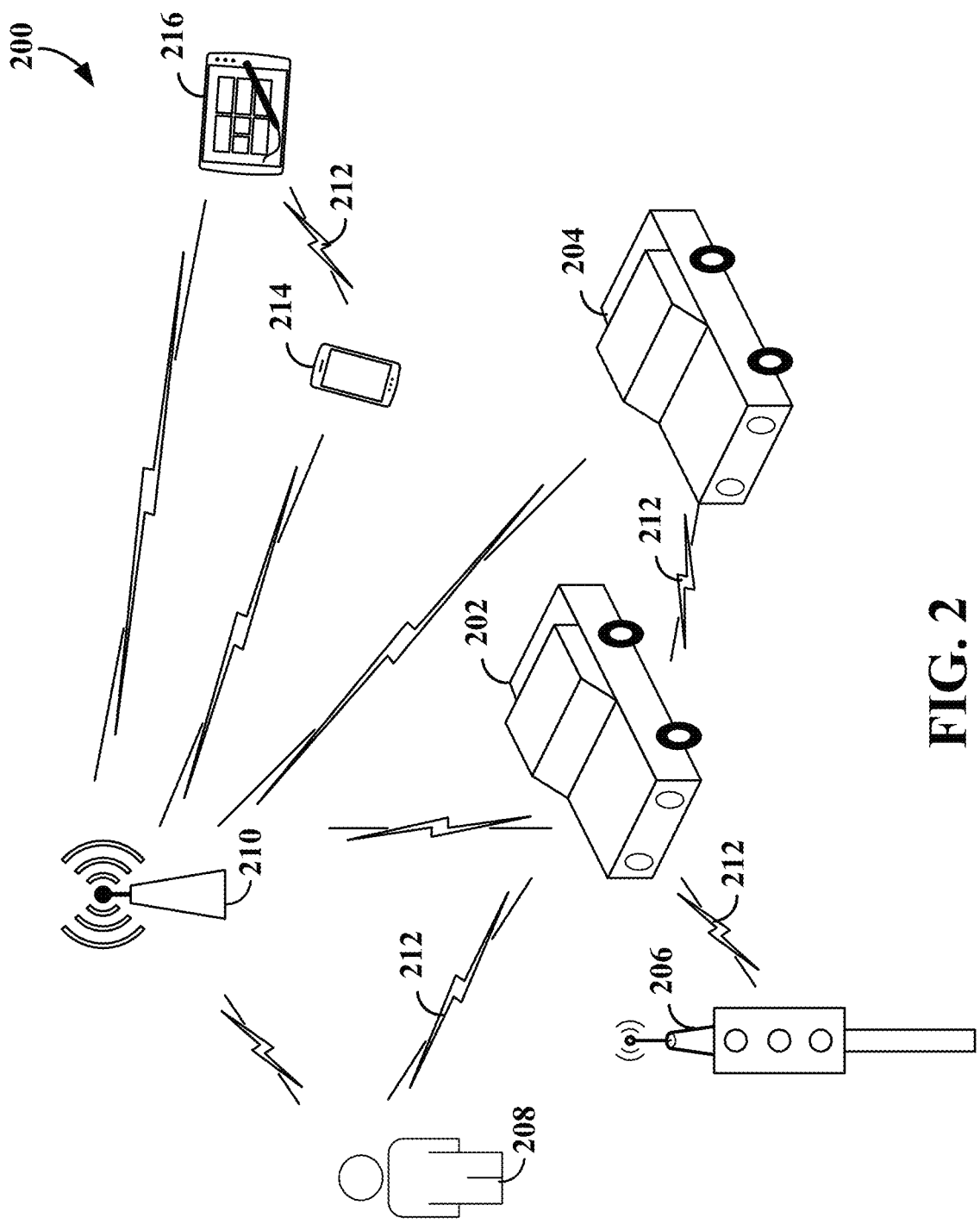
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
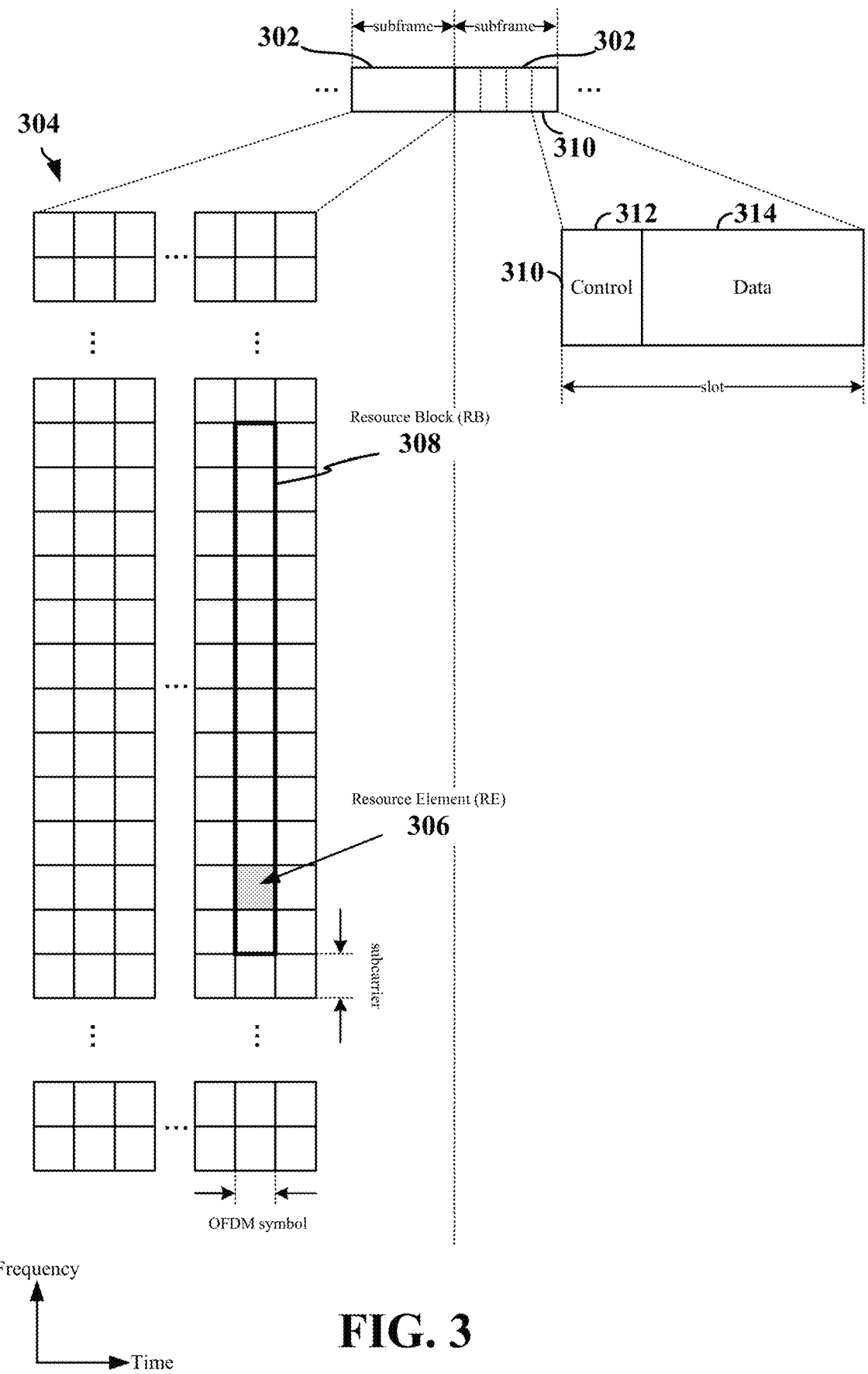
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
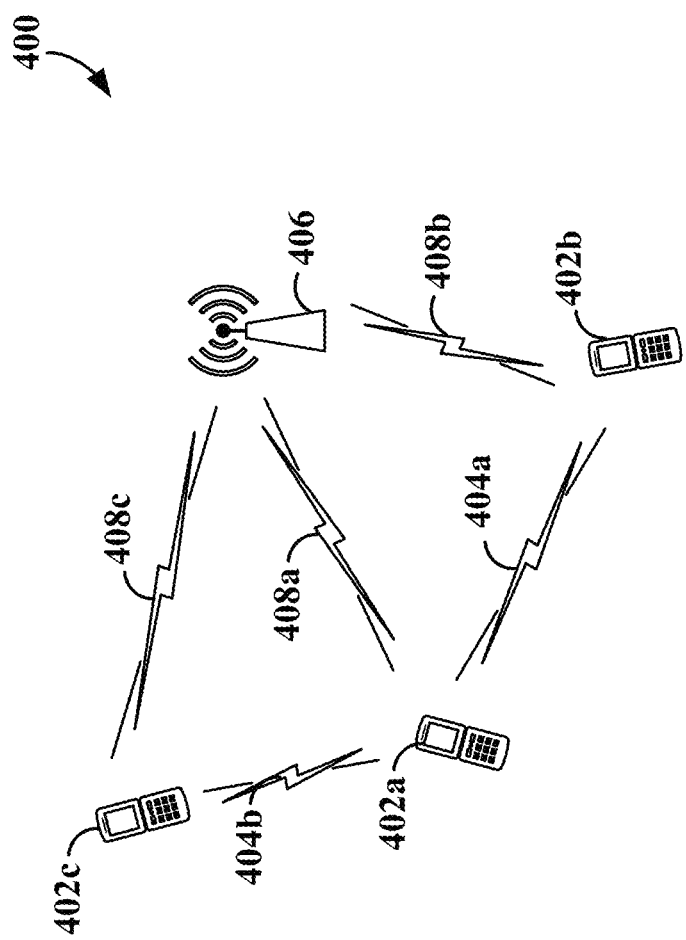
FIG. 4 is a diagram illustrating an example of a wireless communication system for facilitating both cellular and sidelink communication according to some aspects.

FIG. 4 is a diagram illustrating an example of a wireless communication system 400 for facilitating both cellular and sidelink communication. The wireless communication system 400 includes a plurality of wireless communication devices 402a, 402b, and 402c and a base station (e.g., eNB or gNB) 406. In some examples, the wireless communication devices 402a, 402b, and 402c may be UEs capable of implementing sidelink communication (e.g., D2D or V2X).

The wireless communication devices 402a and 402b may communicate over a first sidelink 404a, while wireless communication devices 402a and 402c may communicate over a second sidelink 404b. Each of the sidelinks 404a and 404b may utilize, for example, a PC5 interface. Wireless communication devices 402a, 402b, and 402c may further communicate with the base station 406 over respective Uu links 408a, 408b, and 408b. The sidelink communication over the sidelinks 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 404a and 404b and Uu links 408a-408c, such that resources on the common carrier may be allocated for both sidelink communication between wireless communication devices 402a-402c and cellular communication (e.g., uplink and downlink communication) between the wireless communication devices 402a-402c and the base station 406. For example, the wireless communication system 400 may be configured to support a Mode 1 sidelink network in which resources for both sidelink and cellular communication are scheduled by the base station 406. In other examples in which Mode 2 sidelink is implemented on the sidelinks 404a and 404b, the wireless communication devices 402a-402c may autonomously select sidelink resources (e.g., from one or more frequency bands or sub-bands designated for sidelink communication) for communication therebetween. In this example, the wireless communication devices 402a-402c may function as both scheduling entities and scheduled entities scheduling sidelink resources for communication with each other.

In some examples, there may be a mismatch between the signal-to-noise (SNR) ratio experienced on the sidelink (e.g., sidelinks 404a and 404b of a wireless communication device 402a) and the SNR experienced on the uplink (e.g., Uu interface 408a) between the wireless communication device 402a and the base station 406. For example, the SNR on the sidelink may be much higher than the SNR on the uplink due to the close proximity of the wireless communication devices 402a-402c as compared to the larger distance between the wireless communication device 402a and the base station 406.

In various aspects of the disclosure, the SNR mismatch may be exploited to obtain higher throughputs by utilizing the same resources for concurrent uplink and sidelink communication. For example, the wireless communication device 402a may be configured to generate a superposition transmission of a sidelink signal and an uplink signal. The superposition transmission may include a base layer corresponding to the weaker uplink signal and an enhancement layer corresponding to the stronger sidelink signal. The base layer may be transmitted at a higher power than the enhancement layer to enable the base station 406 to receive the base layer, while further allowing reception of the superposition transmission including both the base layer and the enhancement layer by one or more receiving sidelink wireless communication devices (e.g., wireless communication devices 402b and 402c). In some examples, interference cancellation of the base layer may be performed by the receiving wireless communication devices 402b and 402c to obtain the enhancement layer. For example, the transmitting wireless communication device 402a may transmit interference assistance information related to the base layer to the receiving wireless communication devices 402b and 402c for use in canceling the base layer from the received superposition transmission.

Figure 5:
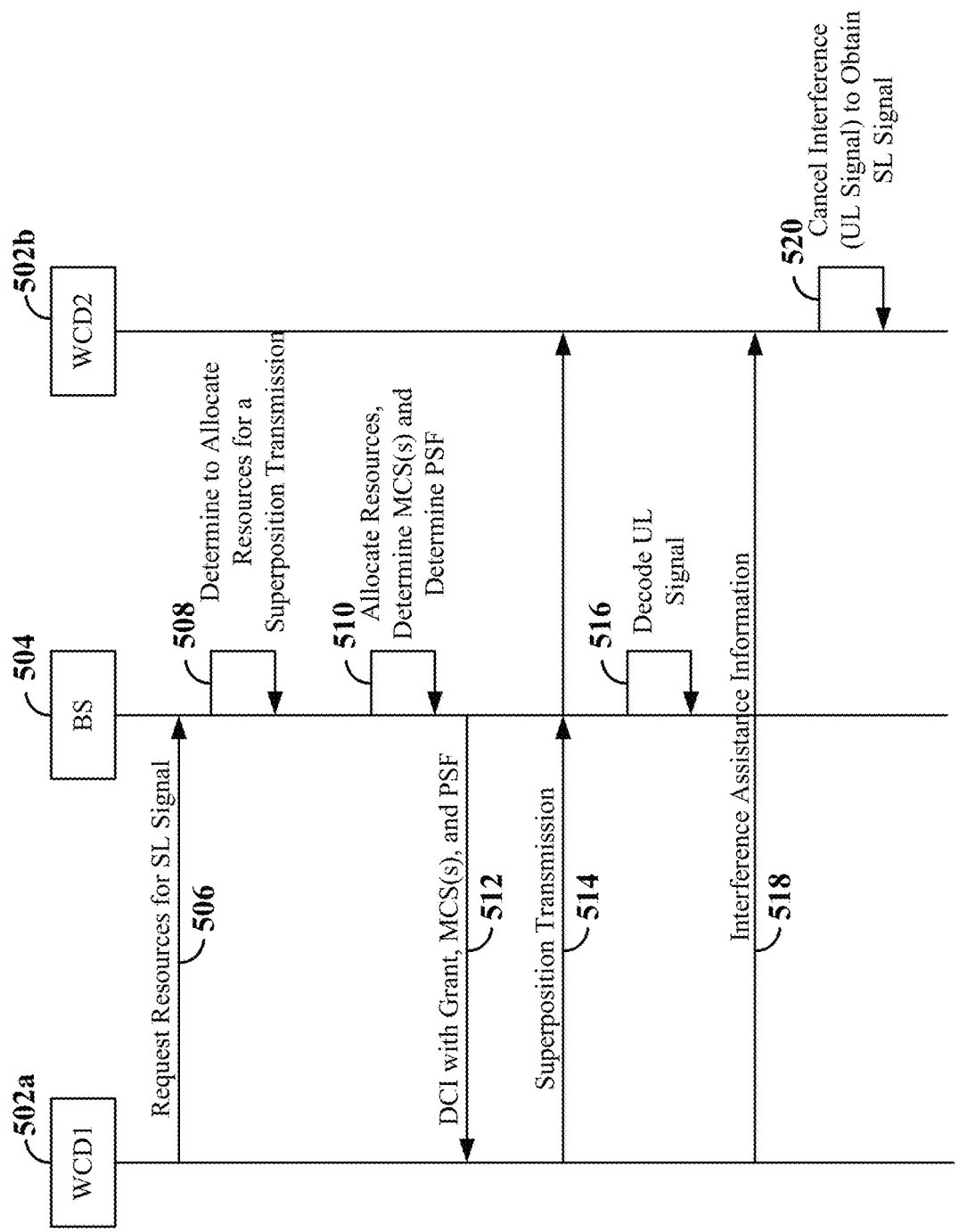
FIG. 5 is a signaling diagram illustrating exemplary signaling for a superposition transmission of sidelink and uplink according to some aspects.

FIG. 5 is a signaling diagram illustrating exemplary signaling for a superposition transmission of sidelink and uplink within a wireless communication network according to some aspects. The wireless communication network may correspond, for example, to the wireless communication network shown in FIGS. 1, 2 and/or 4. The wireless communication network may include two or more wireless communication devices (WCDs) 502a and 502b and a base station 504. Each WCD 502a and 502b may correspond, for example, to a UE, D2D device, or V2X device as shown in FIGS. 1, 2, and/or 4. The base station 504 may correspond, for example, to a gNB or eNB, as illustrated in any one or more of FIGS. 1, 2, and/or 4.

At 506, a first WCD 502a (e.g., WCD1) may generate and transmit a request for resources for the transmission of a sidelink signal to the base station 504 via the Uu cellular link (e.g., Uu interface). In some examples, the request may include a scheduling request. For example, the scheduling request may include one or more of a sidelink packet priority of the sidelink signal, a sidelink buffer status report, or a sidelink quality (e.g., a sidelink path loss measured by the WCD1 502a on one or more sidelinks (e.g., PC5 interfaces)). In some examples, the scheduling request may include a request for resources for a superposition transmission of the sidelink signal and an uplink signal. In this example, the scheduling request may further include one or more of the uplink packet priority of the uplink signal, an uplink buffer status report, an uplink quality (e.g., an uplink path loss measured by the WCD1 502a on the Uu interface), and/or other parameters related to the uplink signal. In other examples, the uplink quality may be provided to the base station 504 separately from the scheduling request. The uplink path loss may correspond, for example, to the path loss measured by the WCD1 502a on the downlink. In some examples, the scheduling request may include separate scheduling requests for the sidelink signal and the uplink signal. In this example, the separate scheduling requests may be transmitted within the same slot (e.g., within different UCI of a PUCCH) or within different slots.

At 508, the base station 504 may determine to allocate resources for a superposition transmission of a sidelink signal and an uplink signal by WCD1 502a based on the received scheduling request(s). In some examples, the base station 504 may determine to allocate superposition resources based on separate scheduling requests, each requesting resources for one of the sidelink signal and the uplink signal. In other examples, the base station 504 may determine to allocate superposition resources based on the scheduling request for the superposition resources (e.g., the scheduling request requesting resources for the superposition transmission of a sidelink signal and an uplink signal). In other examples, the base station 504 may determine to allocate the superposition resources based on the sidelink scheduling request and previously configured uplink resources (e.g., semi-persistently scheduled (SPS) resources or other periodic uplink resources).

At 510, the base station 504 may allocate resources on a common carrier shared between sidelink communication (e.g., communication over the sidelinks (e.g., PC5 interfaces)) and uplink communication (e.g., communication over the Uu interfaces) for the superposition transmission. For example, the base station 504 may allocate one or more PRBs or REs within a slot (or multiple slots) of the common carrier for the superposition transmission. The base station 504 may further determine a respective MCS for the WCD1 502*a* to utilize for the sidelink signal and the uplink signal. For example, the base station 504 may determine a first MCS for the uplink signal and a second MCS for the sidelink signal. The first and second MCS may be the same or different.

In addition, the base station 504 may determine a power split factor (PSF) to be used by the WCD1 502*a* in splitting a total power budget of the WCD1 502*a* between a first power of a base layer of the superposition transmission corresponding to the uplink signal and a second power of an enhancement layer of the superposition transmission corresponding to the sidelink signal. For example, based on the sidelink quality (e.g., sidelink path loss) and uplink quality (e.g., uplink path loss) provided by the WCD1 502*a*, the base station 504 may determine a first minimum power of the uplink signal at which the uplink signal can be decoded by the base station 504 and a second minimum power of the sidelink signal at which the sidelink signal can be decoded by a second (receiving) WCD 502*b* (e.g., WCD2). The base station 504 may then identify the power split factor based on the first minimum power and the second minimum power. For example, the base station may select the power split factor to ensure that the transmission power of the base layer including the uplink signal is greater than or equal to the first minimum power and the transmission power of the enhancement layer including the sidelink signal is greater than or equal to the second minimum power.

At 512, the base station 504 may transmit a grant of the allocated resources for the superposition transmission to the WCD1 502*a*. In some examples, the grant may be included within downlink control information (DCI) of a physical downlink control channel (PDCCH). The DCI may further include the respective MCS selected for each of the uplink signal and the sidelink signal. In addition, the DCI may include the PSF.

At 514, the WCD1 502*a* may generate and transmit the superposition transmission including the base layer corresponding to the uplink signal and the enhancement layer corresponding to the sidelink signal towards the base station 504 and at least the WCD2 502*b*. In some examples, the sidelink signal includes a broadcast or groupcast signal that may be transmitted towards and/or received by two or more receiving WCDs. In some examples, the WCD1 502*a* may determine the total power budget of the WCD1 502*a* for the superposition transmission and apply the PSF to the total power budget to generate the base layer at the first power and the enhancement layer at the second power. For example, the WCD1 502*a* may determine the first power $P_{UL}$ as:

$$P_{UL}=\beta P_B, \quad \text{(Equation 1)},$$

Where β is the PSF and $P_B$ is the total power budget, and where (0≤β≤1). In addition, the WCD1 502*a* may determine the second power $P_{SL}$ as:

$$P_{SL}=(1-\beta)P_B. \quad \text{(Equation 2)}$$

In some examples, the total power budget may be determined based on open loop power control parameters and closed loop power control parameters provided by the base station 504 via transmit power control (TPC) commands sent from the base station 504 to the WCD1 502*a*. The open loop power control parameters may determine, for example, initial power settings of the WCD1 502*a* based on path loss and channel configuration, while the closed loop power control parameters may provide for correction in the initial settings. In some examples, the base station 504 may update one or more of the open loop parameters for the superposition transmission. For example, the base station 504 may increase a path loss compensation factor (α) of the open loop power control parameters to allow the WCD1 502*a* to compensate more for uplink path loss. As another example, the base station 504 may modify a cell-specific (or WCD-specific) parameter ($P_o$) of the open loop power control parameters for the superposition transmission.

After determining the first power of the uplink signal and the second power of the sidelink signal based on the PSF, the WCD1 502*a* may generate the uplink signal utilizing the first MCS (selected by the base station 504 for the uplink signal) at the first power to produce the base layer. In addition, the WCD1 502*a* may generate the sidelink signal utilizing the second MCS (selected by the base station 504 for the sidelink signal) at the second power to produce the enhanced layer. The WCD1 502*a* may then superimpose the enhanced layer on the base layer to produce the superposition transmission.

At 516, the base station 504 may receive and decode the base layer including the uplink signal. Based on the PSF, the enhancement layer may not be transmitted by the WCD1 502*a* at a high enough power for the base station 504 to receive the enhancement layer. Thus, the base station 504 may perform normal decoding on the uplink signal.

At 518, the WCD1 502*a* may further generate and transmit interference assistance information to the WCD2 502*b*. The interference assistance information may include information related to the base layer corresponding to the uplink signal. For example, the interference assistance information may include the first MCS of the uplink signal and the PSF. In some examples, the WCD1 502*a* may transmit the interference assistance information within the sidelink control information (SCI) for the sidelink signal. The SCI may further include, for example, the second MCS of the sidelink signal. In other examples, the WCD1 502*a* may transmit the interference assistance information separate from the SCI. For example, the WCD1 502*a* may transmit the interference assistance information in one or more RBs separate from the RBs allocated for the SCI within the slot(s) allocated for the superposition transmission.

At 520, the WCD2 502*b* may cancel the interference (e.g., the base layer including to the uplink signal) from the superposition transmission utilizing the interference assistance information to obtain the enhanced layer including the sidelink signal. For example, based on the first MCS of the uplink signal and PSF, the WCD2 502*b* may be configured to isolate the uplink signal and cancel the uplink signal from the received superposition transmission. The WCD2 502*b* may then decode the received sidelink signal.

Figure 6:
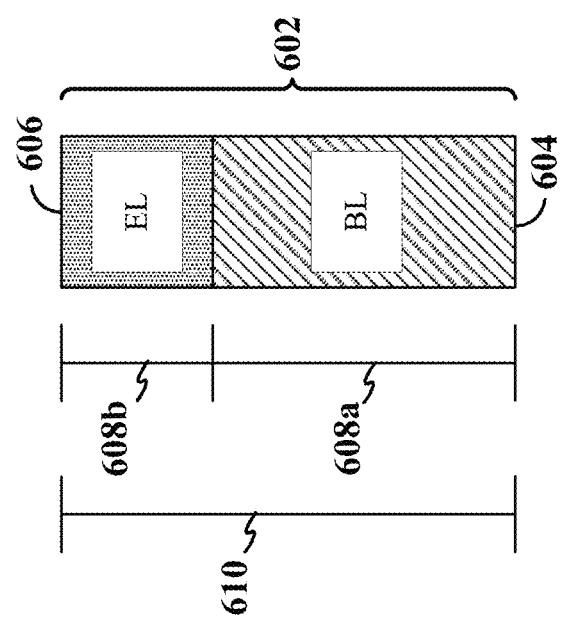
FIG. 6 is a diagram illustrating an exemplary superposition transmission according to some aspects.

FIG. 6 is a diagram illustrating an exemplary superposition transmission 602 generated by a WCD according to some aspects. The superposition transmission 602 includes a base layer (BL) 604 corresponding to the uplink signal and an enhancement layer (EL) 606 corresponding to the sidelink signal. Each of the BL 604 and EL 606 is generated at a respective power 608*a* and 608*b* within a total power budget 610 of the WCD. In the example shown in FIG. 6, the BL 604 is generated at a first power 608*a* that is higher than a second power 608*b* at which the EL 606 is generated. Each of the first power 608*a* and second power 608*b* may be determined by the WCD based on the PSF received from the base station and the total power budget 610.

Figure 7:
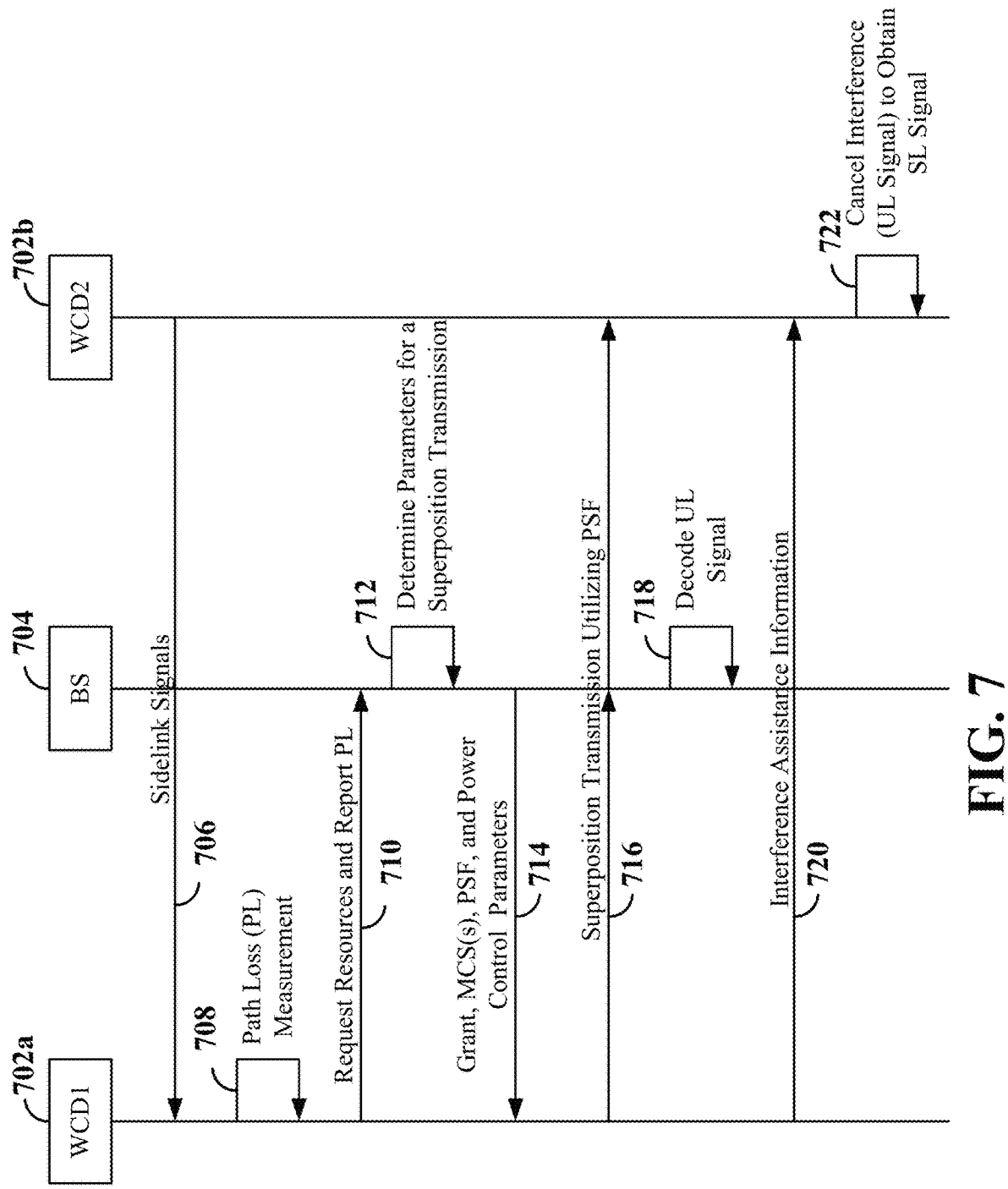
FIG. 7 is a signaling diagram illustrating other exemplary signaling for a superposition transmission according to some aspects.

FIG. 7 is a signaling diagram illustrating other exemplary signaling for a superposition transmission of sidelink and uplink within a wireless communication network according to some aspects. The wireless communication network may correspond, for example, to the wireless communication network shown in FIGS. 1, 2 and/or 4. The wireless communication network may include two or more wireless communication devices (WCDs) 702a and 702b and a base station 704. Each WCD 702a and 702b may correspond, for example, to a UE, D2D device, or V2X device as shown in FIGS. 1, 2, and/or 4. The base station 704 may correspond, for example, to a gNB or eNB, as illustrated in any one or more of FIGS. 1, 2, and/or 4.

At 706, a first WCD 702a (e.g., WCD1) may receive sidelink signals from at least a second WCD 702b via at least one corresponding PC5 link (e.g., PC5 interface). The sidelink signals may include, for example a PSCCH carrying SCI and/or a PSSCH. At 708, the WCD1 702a may measure the average path loss on the sidelink (e.g., on one or more PC5 interfaces with other WCDs) over a window of time ($T_w$). In some examples, the WCD1 702a may measure the reference signal received power (RSRP) of reference signals included in SCI decoded from nearby WCDs (e.g., WCD2 702b) over $T_w$. The WCD1 702a may then calculate the average RSRP over $T_w$ to determine the sidelink path loss.

At 710, the WCD1 702a may generate and transmit a request for resources for the transmission of a sidelink signal to the base station 704, along with the average sidelink path loss obtained at 708. In some examples, the request may include a scheduling request. For example, the scheduling request may include the sidelink path loss and one or more of a sidelink packet priority of the sidelink signal or a sidelink buffer status report. In some examples, the scheduling request may include a request for resources for a superposition transmission of the sidelink signal and an uplink signal. In this example, the scheduling request may further include one or more of the uplink packet priority of the uplink signal, an uplink buffer status report, an uplink quality (e.g., an uplink path loss measured by the WCD1 702a on the Uu cellular link (e.g., Uu interface)), and/or other parameters related to the uplink signal. In other examples, the uplink quality may be provided to the base station 704 separately from the scheduling request. The uplink path loss may correspond, for example, to the path loss measured by the WCD1 on the downlink. In some examples, the scheduling request may include separate scheduling requests for the sidelink signal and the uplink signal. In this example, the separate scheduling requests may be transmitted within the same slot (e.g., within different UCI of a PUCCH) or within different slots.

At 712, the base station 704 may determine one or more parameters for the superposition transmission. For example, the base station 704 may allocate resources on a common carrier shared between sidelink communication (e.g., communication over the PC5 links/interfaces) and uplink communication (e.g., communication over the Uu links/interfaces) for the superposition transmission. The base station 704 may further determine a respective MCS for the WCD1 702a to utilize for the sidelink signal and the uplink signal. For example, the base station 704 may determine a first MCS for the uplink signal and a second MCS for the sidelink signal. The first and second MCS may be the same or different.

In addition, the base station 704 may determine a power split factor (PSF) to be used by the WCD1 702a in splitting a total power budget of the WCD1 702a between a first power of a base layer of the superposition transmission corresponding to the uplink signal and a second power of an enhancement layer of the superposition transmission corresponding to the sidelink signal. For example, based on the sidelink path loss and uplink path loss provided by the WCD1 702a, the base station 704 may determine a first minimum power of the uplink signal at which the uplink signal can be decoded by the base station 704 and a second minimum power of the sidelink signal at which the sidelink signal can be decoded by a second (receiving) WCD 702b (e.g., WCD2). The base station 704 may then identify the power split factor based on the first minimum power and the second minimum power.

The base station 704 may further configure one or more power control parameters for the superposition transmission. For example, the base station 704 may configure open loop power control parameters and closed loop power control parameters for the superposition transmission. In some examples, the base station 704 may update one or more of the open loop parameters for the superposition transmission. For example, the base station 704 may increase a path loss compensation factor ($\alpha$) of the open loop power control parameters to allow the WCD1 702a to compensate more for uplink path loss. As another example, the base station 704 may modify a cell-specific (or WCD-specific) parameter ($P_o$) of the open loop power control parameters for the superposition transmission.

At 714, the base station 704 may transmit a grant of the allocated resources for the superposition transmission to the WCD1 702a. In some examples, the grant may be included within DCI of a PDCCH. The DCI may further include the respective MCS selected for each of the uplink signal and the sidelink signal. In addition, the DCI may include the PSF. The base station 704 may further transmit the open loop and closed loop power control parameters to the WCD1 702a. In some examples, the base station 704 may transmit one or more TPC commands including, for example, closed loop power control parameters and/or open loop power control parameters for the superposition transmission. TPC commands may be included within, for example, the DCI or a medium access control-control element (MAC-CE). In some examples, a TPC command including updated open loop power control parameters may be included with the grant. In some examples, a TPC command including the closed loop power control parameters may be included with the grant or transmitted separately. For example, the closed loop power control parameters may be transmitted prior to receiving the request for resources for the superposition transmission.

At 716, the WCD1 702a may generate and transmit the superposition transmission including the base layer corresponding to the uplink signal and the enhancement layer corresponding to the sidelink signal towards the base station 704 and at least the WCD2 702b. In some examples, the sidelink signal includes a broadcast or groupcast signal that may be transmitted towards and/or received by two or more receiving WCDs. In some examples, the WCD1 702a may determine the total power budget of the WCD1 702a for the superposition transmission based on the open loop and closed loop power control parameters and apply the PSF to the total power budget to generate the base layer at the first power and the enhancement layer at the second power, as indicated in Equations 1 and 2 above. For example, the WCD1 702a may generate the uplink signal utilizing the first MCS (selected by the base station 704 for the uplink signal) at the first power to produce the base layer. In addition, the WCD1 702a may generate the sidelink signal utilizing the second MCS (selected by the base station 704 for the sidelink signal) at the second power to produce the enhanced layer. The WCD1 702*a* may then superimpose the enhanced layer on the base layer to produce the superposition transmission.

At 718, the base station 704 may receive and decode the base layer including the uplink signal. Based on the PSF, the enhancement layer may not be transmitted by the WCD1 702*a* at a high enough power for the base station 704 to receive the enhancement layer. Thus, the base station 704 may perform normal decoding on the uplink signal.

At 720, the WCD1 702*a* may further generate and transmit interference assistance information to the WCD2 702*b*. The interference assistance information may include information related to the base layer corresponding to the uplink signal. For example, the interference assistance information may include the first MCS of the uplink signal and the PSF. In some examples, the WCD1 702*a* may transmit the interference assistance information within the sidelink control information (SCI) for the sidelink signal. The SCI may further include, for example, the second MCS of the sidelink signal. In other examples, the WCD1 702*a* may transmit the interference assistance information separate from the SCI. For example, the WCD1 702*a* may transmit the interference assistance information in one or more RBs separate from the RBs allocated for the SCI within the slot(s) allocated for the superposition transmission.

At 722, the WCD2 702*b* may cancel the interference (e.g., the base layer including to the uplink signal) from the superposition transmission utilizing the interference assistance information to obtain the enhanced layer including the sidelink signal. For example, based on the first MCS of the uplink signal and PSF, the WCD2 702*b* may be configured to isolate the uplink signal and cancel the uplink signal from the received superposition transmission. The WCD2 702*b* may then decode the received sidelink signal.

Figure 8:
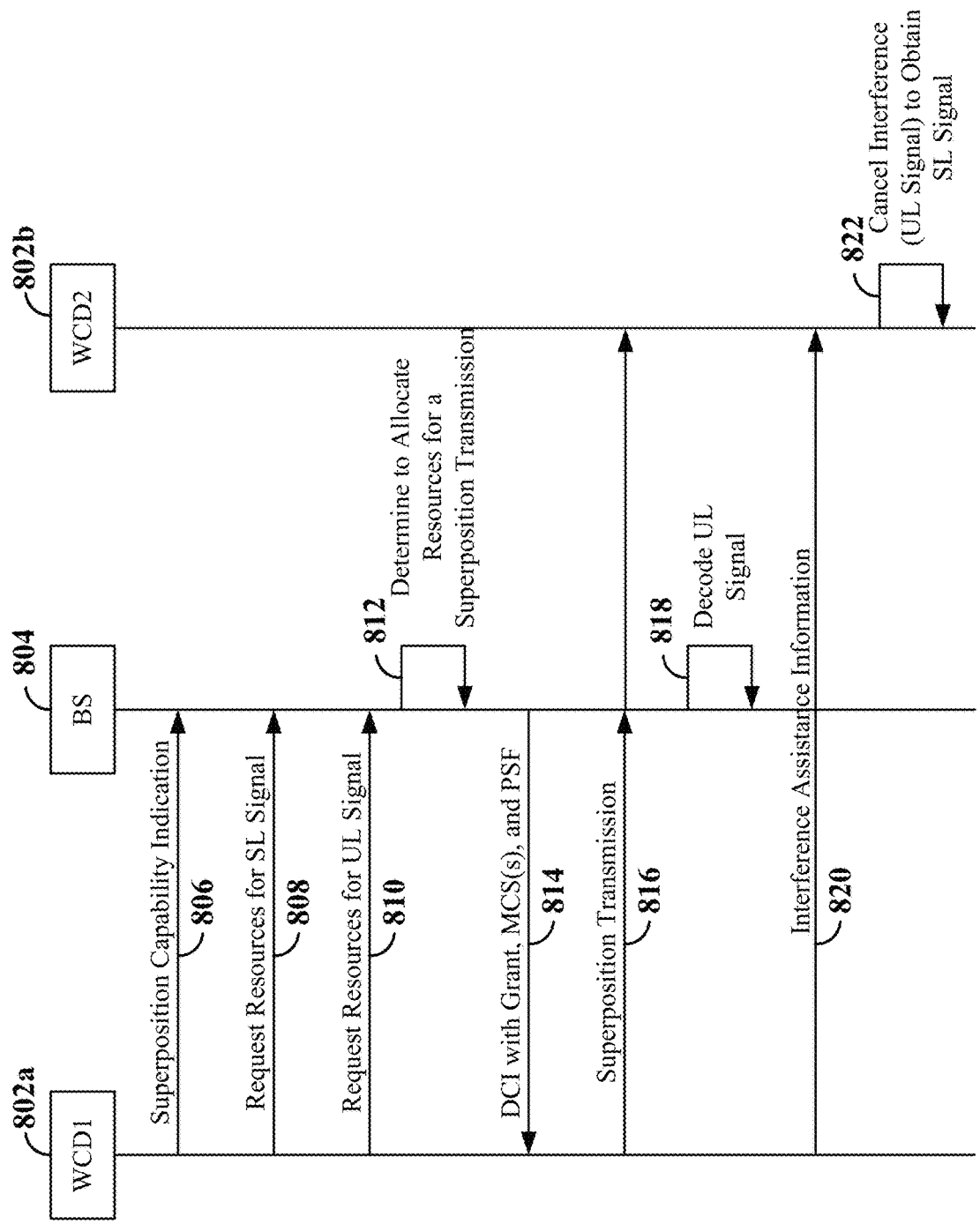
FIG. 8 is a signaling diagram illustrating other exemplary signaling for a superposition transmission according to some aspects.

FIG. 8 is a signaling diagram illustrating other exemplary signaling for a superposition transmission of sidelink and uplink within a wireless communication network according to some aspects. The wireless communication network may correspond, for example, to the wireless communication network shown in FIGS. 1, 2 and/or 4. The wireless communication network may include two or more wireless communication devices (WCDs) 802*a* and 802*b* and a base station 804. Each WCD 802*a* and 802*b* may correspond, for example, to a UE, D2D device, or V2X device as shown in FIGS. 1, 2, and/or 4. The base station 804 may correspond, for example, to a gNB or eNB, as illustrated in any one or more of FIGS. 1, 2, and/or 4.

At 806, a first WCD 802*a* (e.g., WCD1) may generate and transmit a superposition capability indication to the base station 804. The superposition capability indication may indicate a capability of the WCD1 802*a* to perform a superposition transmission of uplink and sidelink signals.

At 808, the WCD1 802*a* may then generate and transmit a request for resources for the transmission of a sidelink signal to the base station 804. In some examples, the request may include a scheduling request. For example, the scheduling request may include one or more of a sidelink packet priority of the sidelink signal, a sidelink buffer status report, or a sidelink quality (e.g., average sidelink path loss).

At 810, the WCD1 802*a* may further generate and transmit a request for resources for the transmission of an uplink signal to the base station 804. In some examples, the request may include a separate scheduling request than the scheduling request for the transmission of the sidelink signal. In this example, the separate scheduling requests may be transmitted within the same slot (e.g., within different UCI of a PUCCH) or within different slots. In some examples, the scheduling request may further include one or more of the uplink packet priority of the uplink signal, an uplink buffer status report, an uplink quality (e.g., an uplink path loss measured by the WCD1 802*a* on the Uu link/interface), and/or other parameters related to the uplink signal. In other examples, the uplink quality may be provided to the base station 804 separately from the scheduling request. The uplink path loss may correspond, for example, to the path loss measured by the WCD1 on the downlink.

At 812, the base station 804 may determine to allocate resources for a superposition transmission of the sidelink signal and the uplink signal based on the superposition capability indication and the received scheduling requests. In some examples, the base station 804 may determine to allocate the superposition resources based on the sidelink scheduling request and previously configured uplink resources (e.g., semi-persistently scheduled (SPS) resources or other periodic uplink resources) instead of the uplink scheduling request. The base station may further allocate one or more parameters for the superposition transmission. For example, the base station 804 may allocate resources on a common carrier shared between sidelink communication (e.g., communication over the PC5 links/interfaces) and uplink communication (e.g., communication over the Uu links/interfaces) for the superposition transmission. The base station 804 may further determine a respective MCS for the WCD1 802*a* to utilize for the sidelink signal and the uplink signal. For example, the base station 804 may determine a first MCS for the uplink signal and a second MCS for the sidelink signal. The first and second MCS may the same or different.

In addition, the base station 804 may determine a power split factor (PSF) to be used by the WCD1 802*a* in splitting a total power budget of the WCD1 802*a* between a first power of a base layer of the superposition transmission corresponding to the uplink signal and a second power of an enhancement layer of the superposition transmission corresponding to the sidelink signal. For example, based on the sidelink path loss and uplink path loss provided by the WCD1 802*a*, the base station 804 may determine a first minimum power of the uplink signal at which the uplink signal can be decoded by the base station 804 and a second minimum power of the sidelink signal at which the sidelink signal can be decoded by a second (receiving) WCD 802*b* (e.g., WCD2). The base station 804 may then identify the power split factor based on the first minimum power and the second minimum power.

At 814, the base station 804 may transmit a grant of the allocated resources for the superposition transmission to the WCD1 802*a*. In some examples, the grant may be included within DCI of a PDCCH. The DCI may further include the respective MCS selected for each of the uplink signal and the sidelink signal. In addition, the DCI may include the PSF.

At 816, the WCD1 802*a* may generate and transmit the superposition transmission including the base layer corresponding to the uplink signal and the enhancement layer corresponding to the sidelink signal towards the base station 804 and at least the WCD2 802*b*. In some examples, the sidelink signal includes a broadcast or groupcast signal that may be transmitted towards and/or received by two or more receiving WCDs. In some examples, the WCD1 802*a* may determine the total power budget of the WCD1 802*a* for the superposition transmission based on open loop and closed loop power control parameters provided by the base station 804 and apply the PSF to the total power budget to generate the base layer at the first power and the enhancement layer at the second power, as indicated in Equations 1 and 2 above. For example, the WCD1 802a may generate the uplink signal utilizing the first MCS (selected by the base station 804 for the uplink signal) at the first power to produce the base layer. In addition, the WCD1 802a may generate the sidelink signal utilizing the second MCS (selected by the base station 804 for the sidelink signal) at the second power to produce the enhanced layer. The WCD1 802a may then superimpose the enhanced layer on the base layer to produce the superposition transmission.

At 818, the base station 804 may receive and decode the base layer including the uplink signal. Based on the PSF, the enhancement layer may not be transmitted by the WCD1 802a at a high enough power for the base station 804 to receive the enhancement layer. Thus, the base station 804 may perform normal decoding on the uplink signal.

At 820, the WCD1 802a may further generate and transmit interference assistance information to the WCD2 802b. The interference assistance information may include information related to the base layer corresponding to the uplink signal. For example, the interference assistance information may include the first MCS of the uplink signal and the PSF. In some examples, the WCD1 802a may transmit the interference assistance information within the sidelink control information (SCI) for the sidelink signal. The SCI may further include, for example, the second MCS of the sidelink signal. In other examples, the WCD1 802a may transmit the interference assistance information separate from the SCI. For example, the WCD1 802a may transmit the interference assistance information in one or more RBs separate from the RBs allocated for the SCI within the slot(s) allocated for the superposition transmission.

At 822, the WCD2 802b may cancel the interference (e.g., the base layer including to the uplink signal) from the superposition transmission utilizing the interference assistance information to obtain the enhanced layer including the sidelink signal. For example, based on the first MCS of the uplink signal and PSF, the WCD2 802b may be configured to isolate the uplink signal and cancel the uplink signal from the received superposition transmission. The WCD2 802b may then decode the received sidelink signal.

Figure 9:
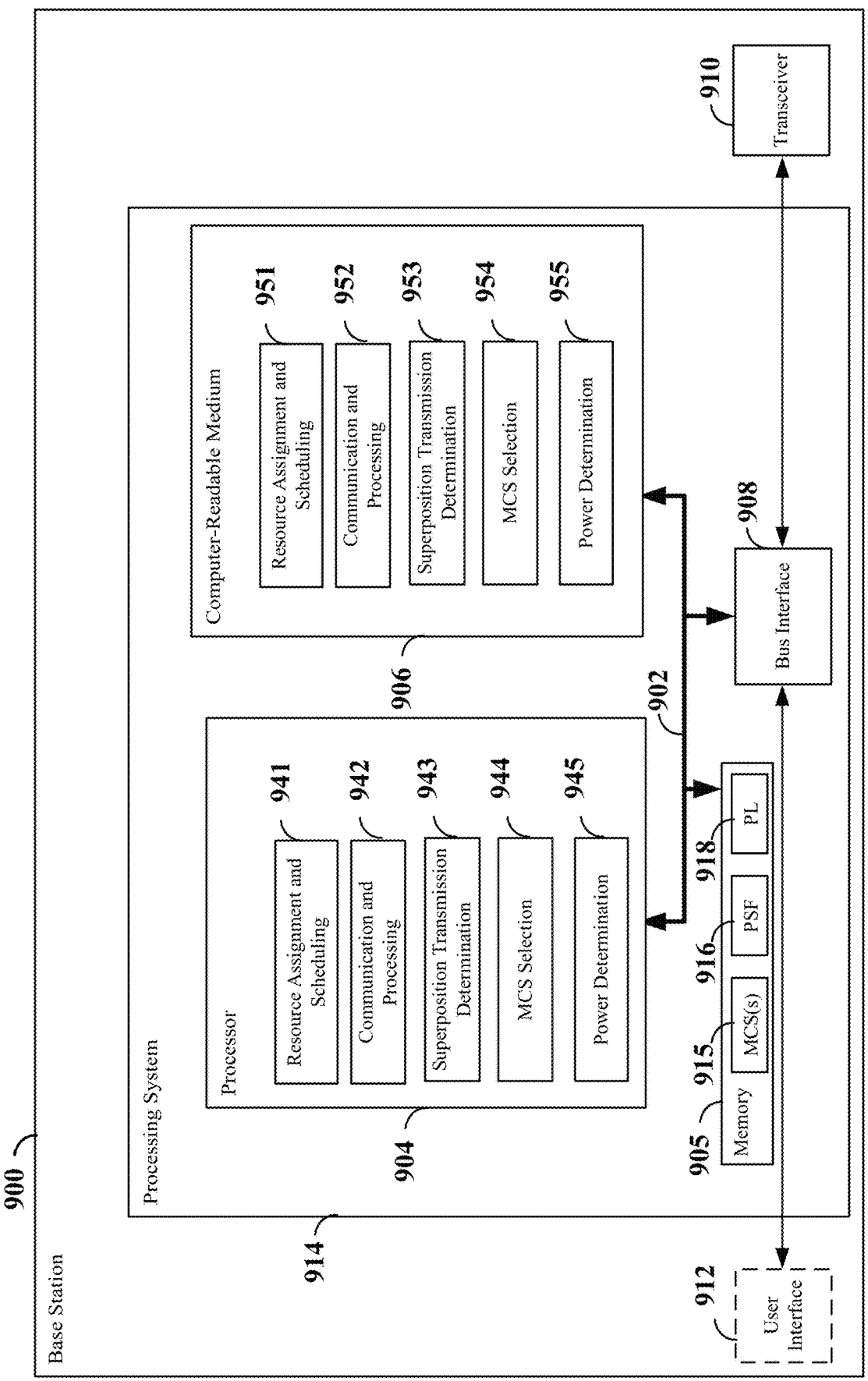
FIG. 9 is a block diagram illustrating an example of a hardware implementation for a base station employing a processing system according to some aspects.

FIG. 9 is a block diagram illustrating an example of a hardware implementation for a base station 900 employing a processing system 914. For example, the base station 900 may correspond to a gNB or eNB, as shown and described above in reference to FIGS. 1, 2 4, 5, 7, and/or 8.

The base station 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 900 may be configured to perform any one or more of the functions described herein. That is, the processor 904, as utilized in the base station 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include resource assignment and scheduling circuitry 941, configured to generate, schedule, and modify a resource assignment or grant of time-frequency resources (e.g., a set of one or more resource elements). For example, the resource assignment and scheduling circuitry 941 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 941 may be configured to allocate/schedule resources on the uplink for the transmission of one or more scheduling requests from a wireless communication device in wireless communication with the base station. For example, the resource assignment and scheduling circuitry 941 may be configured to schedule resources for a wireless communication device to transmit a scheduling request for a sidelink signal and/or a scheduling request for an uplink signal.

The resource assignment and scheduling circuitry 941 may further be configured to schedule resources for a superposition transmission of a base layer including an uplink signal and an enhancement layer including a sidelink signal by the wireless communication device. The resource assignment and scheduling circuitry 941 may further be configured to schedule resources on the downlink for the transmission of downlink control information (DCI) including a grant indicating the resources allocated for the superposition transmission. The resource assignment and scheduling circuitry 941 may further be configured to execute resource assignment and scheduling software 951 stored in the computer-readable medium 906 to implement one or more of the functions described herein.

The processor 904 may further include communication and processing circuitry 942, configured to communicate with one or more wireless communication devices via the transceiver 910. The communication and processing circuitry 942 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 942 may be configured to generate and transmit downlink user data traffic and downlink control channels within one or more subframes, slots, and/or mini-slots in accordance with the resources assigned to the downlink user data traffic and/or downlink control information by the resource assignment and scheduling circuitry 941. In addition, the communication and processing circuitry 942 may be configured to receive and process uplink user data traffic and uplink control channels within one or more subframes, slots, and/or mini-slots in accordance with the resources assigned to the uplink user data traffic and/or uplink control information by the resource assignment and scheduling circuitry 941.

In some examples, the communication and processing circuitry 942 may be configured to receive and process one or more scheduling requests from a wireless communication device requesting resources for the transmission of a sidelink signal and/or an uplink signal. The communication and processing circuitry 942 may further be configured to receive and process an average sidelink path loss measured by the wireless communication device over a window of time and/or an uplink path loss (e.g., measured by the wireless communication device on the downlink). The received uplink and sidelink path loss 918 may further be received within the scheduling request(s). In addition, the communication and processing circuitry 942 may store the received uplink and sidelink path loss 918 within, for example, the memory 905 for subsequent processing thereof.

In addition, the communication and processing circuitry 942 may be configured to generate and transmit to the wireless communication device a grant of resources allocated by the resource assignment and scheduling circuitry 941 for a superposition transmission of an uplink signal and a sidelink signal. In some examples, the grant may be included within DCI of a PDCCH. The DCI may further include a respective MCS selected for each of the uplink signal and the sidelink signal. In addition, the DCI may include a power split factor (PSF). The communication and processing circuitry 942 may further be configured to generate and transmit one or more TPC commands including open loop and closed loop power control parameters for the superposition transmission to the wireless communication device. TPC commands may be included within, for example, the DCI or a medium access control-control element (MAC-CE). The communication and processing circuitry 942 may further be configured to execute communication and processing software 952 stored on the computer-readable medium 906 to implement one or more functions described herein.

The processor 904 may further include superposition transmission determination circuitry 943, configured to determine to allocate resources for the superposition transmission to the wireless communication device. In some examples, the superposition transmission determination circuitry 943 may be configured to determine to allocate superposition resources based on separate scheduling requests received from the wireless communication device, each requesting resources for one of the sidelink signal and the uplink signal. For example, the superposition transmission determination circuitry 943 may determine to allocate resources for the superposition transmission based on a capability indication received from the wireless communication device indicating the wireless communication device is capable of performing the superposition transmission.

In other examples, the superposition transmission determination circuitry 943 may be configured to determine to allocate superposition resources based on a scheduling request for the superposition resources (e.g., the scheduling request requesting resources for the superposition transmission of a sidelink signal and an uplink signal). In other examples, the superposition transmission determination circuitry 943 may determine to allocate the superposition resources based on the sidelink scheduling request and previously configured uplink resources (e.g., semi-persistently scheduled (SPS) resources or other periodic uplink resources). In this example, the superposition transmission determination circuitry 943 may determine to allocate resources for the superposition transmission based on the superposition capability indication received from the wireless communication device.

The superposition transmission determination circuitry 943 may further be configured to operate together with the resource assignment and scheduling circuitry 941 to allocate resources on a common carrier shared between sidelink communication (e.g., communication over the PC5 links) and uplink communication (e.g., communication over the Uu links) for the superposition transmission. For example, the resource assignment and scheduling circuitry 941 may allocate one or more PRBs or REs within a slot (or multiple slots) of the common carrier for the superposition transmission. The superposition transmission determination circuitry 943 may further be configured to execute superposition transmission determination software 953 stored on the computer-readable medium 906 to implement one or more functions described herein.

The processor 904 may further include MCS selection circuitry 944, configured to select a respective MCS 915 for each of the uplink signal and the sidelink signal. In some examples, the uplink MCS and sidelink MCS may be the same or different. In addition, the MCS selection circuitry 944 may store the selected MCS 915 for each of the sidelink signal and uplink signal in the memory 905 for use by the communication and processing circuitry 942 in generating and transmitting the DCI for the superposition transmission. The MCS selection circuitry 944 may further be configured to execute MCS selection software 954 stored on the computer-readable medium 906 to implement one or more functions described herein.

The processor 904 may further include power determination circuitry 945, configured to determine the PSF 916 for the superposition transmission. In some examples, the power determination circuitry 945 may be configured to determine the PSF based on the uplink and sidelink path loss 918 provided by the wireless communication device. For example, the power determination circuitry 945 may determine a first minimum power of the uplink signal at which the uplink signal can be decoded by the base station 900 based on the uplink path loss and a second minimum power of the sidelink signal at which the sidelink signal can be decoded by a second (receiving) wireless communication device based on the sidelink path loss. The power determination circuitry 945 may then identify the PSF 916 based on the first minimum power and the second minimum power. For example, the power determination circuitry 945 may select the PSF 916 to ensure that the transmission power of the base layer including the uplink signal is greater than or equal to the first minimum power and the transmission power of the enhancement layer including the sidelink signal is greater than or equal to the second minimum power. The PSF 916 may be stored, for example, in the memory 905 for use by the communication and processing circuitry 942 in generating and transmitting the DCI for the superposition transmission.

The power determination circuitry 945 may further be configured to set one or more power control parameters for the superposition transmission. For example, the power determination circuitry 945 may be configured to set open loop power control parameters and closed loop power control parameters for the superposition transmission. In some examples, the power determination circuitry 945 may update one or more of the open loop parameters for the superposition transmission. For example, the power determination circuitry 945 may increase a path loss compensation factor ($\alpha$) of the open loop power control parameters to allow the wireless communication device to compensate more for uplink path loss. As another example, the power determination circuitry 945 may modify a cell-specific (or WCD-specific) parameter ($P_o$) of the open loop power control parameters for the superposition transmission. The power determination circuitry 945 may further operate together with the communication and processing circuitry 942 to transmit one or more TPC commands to the wireless communication device including the open loop power control parameters and the closed loop power control parameters. For example, the TPC commands may be included in the DCI and/or within a MAC-CE. The power determination circuitry 945 may further be configured to execute power determination software 955 stored on the computer-readable medium 906 to implement one or more functions described herein.

Figure 10:
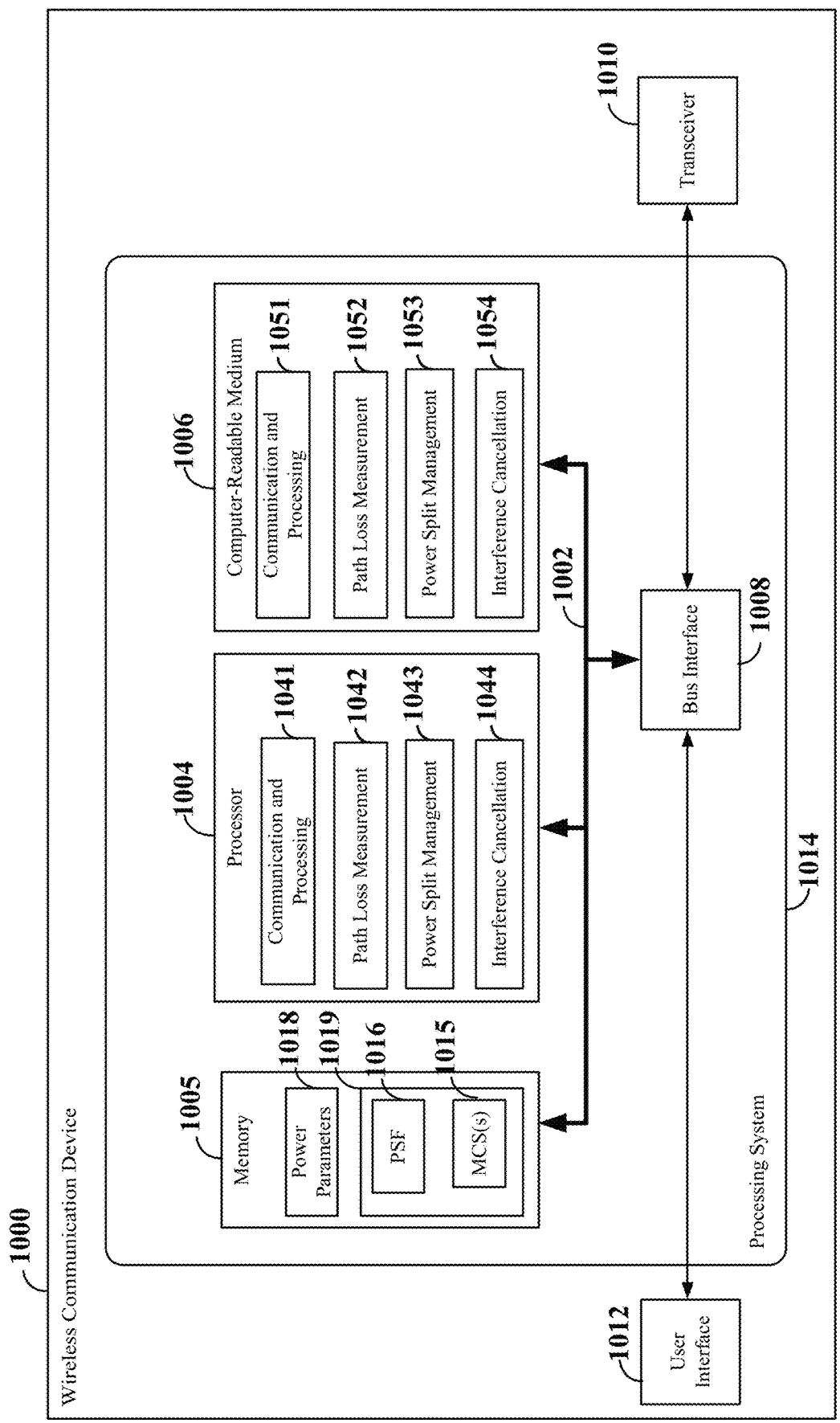
FIG. 10 is a block diagram illustrating an example of a hardware implementation for a wireless communication device employing a processing system according to some aspects.

FIG. 10 is a conceptual diagram illustrating an example of a hardware implementation for an exemplary wireless communication device 1000 employing a processing system 1014. For example, the wireless communication device 1000 may be a UE, D2D device, or V2X device as illustrated in any one or more of FIGS. 1, 2, 4, 5, 7 and/or 8.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes described below. The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1041, configured to communicate with a base station and one or more other wireless communication devices over a common carrier shared between a cellular (e.g., Uu) interface and a sidelink (e.g., PC5) interface. In some examples, the communication and processing circuitry 1041 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1041 may be configured to generate and transmit one or more scheduling requests to the base station requesting resources for the transmission of a sidelink signal and/or an uplink signal. For example, the communication and processing circuitry 1041 may transmit a first scheduling request requesting resources for a sidelink signal and a second scheduling request requesting resources for an uplink signal. As another example, the communication and processing circuitry 1041 may transmit a single scheduling request requesting resources for a superposition transmission of an uplink signal and a sidelink signal. The communication and processing circuitry 1041 may further include a sidelink path loss in the scheduling request for the sidelink signal or the superposition transmission. The uplink path loss may further be transmitted by the communication and processing circuitry 1041 with the scheduling request for the uplink signal or the superposition transmission or separately from the scheduling request. The communication and processing circuitry 1041 may further generate and transmit a capability indication to the base station indicating a capability of the wireless communication device 1000 to perform a superposition transmission.

The communication and processing circuitry 1041 may further be configured to receive and process a grant of resources for the superposition transmission from the base station. In some examples, the grant may be received within DCI further including a respective MCS 1015 to utilize for each of the uplink signal and the sidelink signal and a power split factor (PSF) 1016 to be applied to the uplink signal and the sidelink signal. The MCS(s) 1015 and PSF 1016 may further be stored, for example, in the memory 1005 for further processing. In some examples, the communication and processing circuitry 1041 may further be configured to receive one or more TPC commands including open loop power control parameters and closed loop power control parameters from the base station. The received open/closed loop power control parameters (power parameters) 1018 may further be stored, for example, in the memory 1005 for further processing.

The communication and processing circuitry 1041 may further be configured to generate a superposition transmission of an uplink signal and a sidelink signal based on the allocated resources, the respective MCS for the uplink signal and the sidelink signal and the PSF. For example, the communication and processing circuitry 1041 may be configured to generate and transmit the superposition transmission including a base layer corresponding to the uplink signal and an enhancement layer corresponding to the sidelink signal towards the base station and one or more receiving wireless communication devices. In some examples, the sidelink signal includes a broadcast or groupcast signal that may be transmitted towards and/or received by two or more receiving wireless communication devices.

The communication and processing circuitry 1041 may further be configured to receive and process a superposition transmission received from a transmitting wireless communication device over the common carrier via the transceiver 1010. The communication and processing circuitry 1041 may further be configured to execute communication and processing software 1051 stored in the computer-readable medium 1006 to implement one or more of the functions described herein.

The processor 1004 may further include path loss measurement circuitry 1042, configured to measure an average sidelink path loss (e.g., on one or more PC5 links/interfaces with other wireless communication devices) over a window of time ($T_w$). In some examples, the path loss measurement circuitry 1042 may measure the reference signal received power (RSRP) of reference signals included in SCI decoded from nearby wireless communication devices over $T_w$. The path loss measurement circuitry 1042 may then calculate the average RSRP over $T_w$ to determine the sidelink path loss. The path loss measurement circuitry 1042 may further be configured to measure the uplink path loss. The uplink path loss may correspond, for example, to the path loss measured on the downlink. For example, the path loss measurement circuitry 1042 may measure the RSRP of reference signals included in DCI from the base station to determine the uplink path loss. The path loss measurement circuitry 1042 may further be configured to provide the measured sidelink and uplink path loss to the communication and processing circuitry 1041 for transmission to the base station. The path loss measurement circuitry 1042 may further be configured to execute path loss measurement software 1052 stored in the computer-readable medium 1006 to implement one or more of the functions described herein.

The processor 1004 may further include power split management circuitry 1043 configured to apply the received PSF 1016 to a total power budget of the wireless communication device 1000 to determine a first power at which to generate the uplink signal and a second power at which to generate the sidelink signal. In some examples, the power split management circuitry 1043 may determine the total power budget of the wireless communication device 1000 based on the open/closed loop power control parameters 1018 received from the base station. In some examples, one or more open loop and/or closed loop power control parameters 1018 may be updated by the base station for the superposition transmission. The power split management circuitry 1043 may further operate together with the communication and processing circuitry 1041 to apply the PSF 1016 to the total power budget to generate the base layer at the first power and the enhancement layer at the second power. For example, the communication and processing circuitry 1041 may generate the uplink signal utilizing the first MCS 1015 (selected by the base station for the uplink signal) at the first power to produce the base layer. In addition, the communication and processing circuitry 1041 may generate the sidelink signal utilizing the second MCS 1015 (selected by the base station for the sidelink signal) at the second power to produce the enhanced layer. The communication and processing circuitry 1041 may then superimpose the enhanced layer on the base layer to produce the superposition transmission and transmit the superposition transmission via the transceiver 1010. The power split management circuitry 1043 may further be configured to execute power split management software 1053 stored in the computer-readable medium 1006 to implement one or more of the functions described herein.

The processor 1004 may further include interference cancellation circuitry 1044, configured to transmit or receive interference assistance information. In examples in which the wireless communication device 1000 is a transmitting wireless communication device generating and transmitting the superposition transmission, the interference cancellation circuitry 1044 may be configured to operate together with the communication and processing circuitry 1041 to generate and transmit the interference assistance information 1019 including, for example, the MCS 1015 of the uplink signal and the PSF 1016 to the receiving wireless communication device(s). In some examples, the communication and processing circuitry 1041 may transmit the interference assistance information 1019 within the sidelink control information (SCI) for the superposition transmission including the sidelink signal. The SCI may further include, for example, the second MCS 1015 of the sidelink signal. In other examples, the communication and processing circuitry 1041 may transmit the interference assistance information 1019 separate from the SCI. For example, the communication and processing circuitry 1041 may transmit the interference assistance information 1019 in one or more RBs separate from the RBs allocated for the SCI within the slot(s) allocated for the superposition transmission.

In examples in which the wireless communication device is a receiving wireless communication device receiving the superposition transmission, the interference cancellation circuitry 1044 may be configured to receive, via the communication and processing circuitry 1041, the interference assistance information 1019 and store the interference assistance information within, for example, the memory 1005. The interference cancellation circuitry 1044 may further be configured to operate together with the communication and processing circuitry 1041 to cancel the interference (e.g., the base layer including to the uplink signal) from the superposition transmission utilizing the interference assistance information 1019 to obtain the enhanced layer including the sidelink signal. For example, based on the first MCS 1015 of the uplink signal and PSF 1016, the interference cancellation circuitry 1044 may be configured to isolate the uplink signal and cancel the uplink signal from the received superposition transmission. The communication and processing circuitry 1041 may then decode the received sidelink signal. The interference cancellation circuitry 1044 may further be configured to execute interference cancellation software 1054 stored in the computer-readable medium 1006 to implement one or more of the functions described herein.

Figure 11:
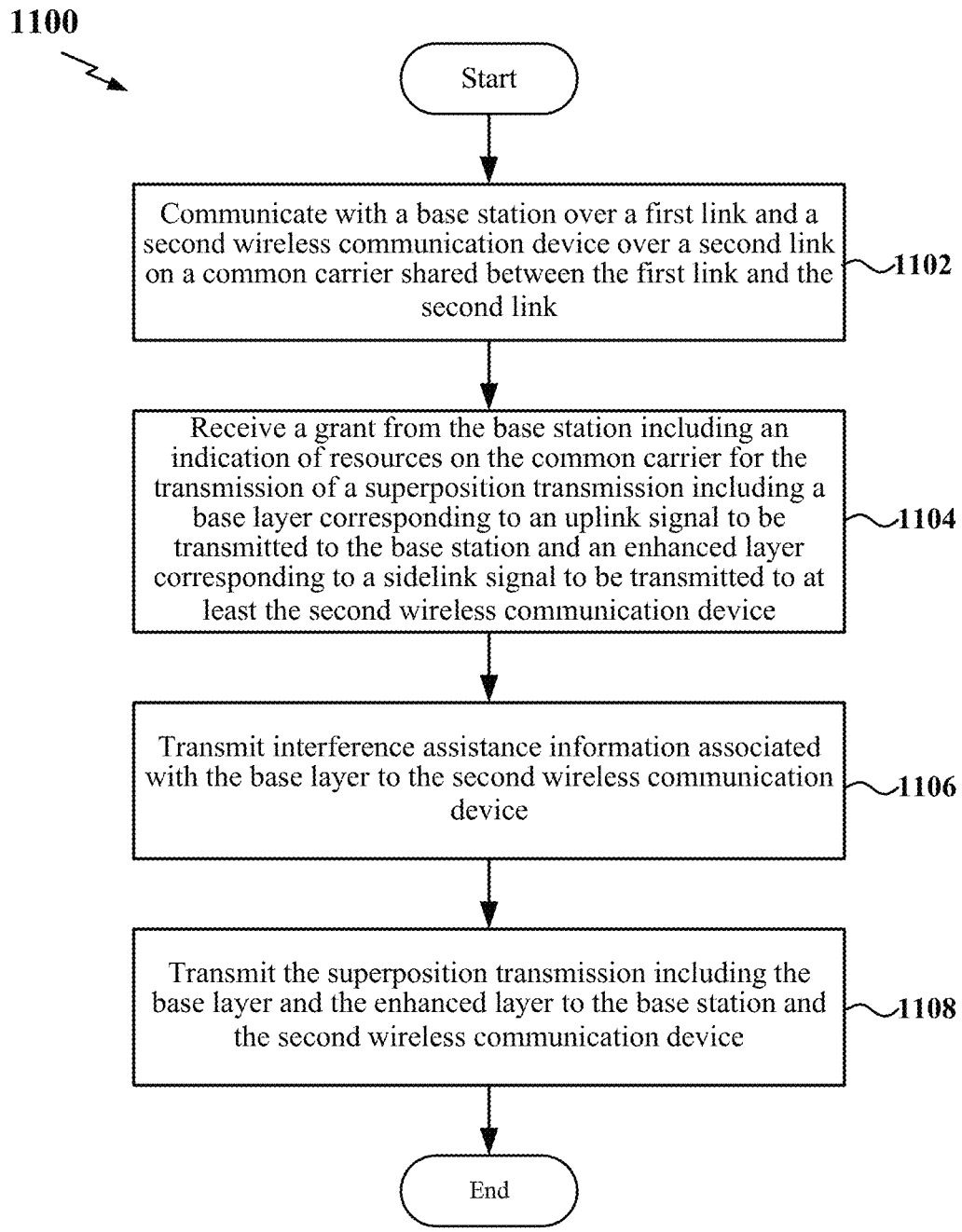
FIG. 11 is a flow chart of an exemplary method for a wireless communication device to generate and transmit a superposition transmission of an uplink signal and a sidelink signal according to some aspects.

FIG. 11 is a flow chart 1100 of a method for a wireless communication device to generate and transmit a superposition transmission of an uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1102, a first (e.g., transmitting) wireless communication device may communicate with a base station over a first link (e.g., Uu cellular interface) and a second sidelink device over a second link (e.g., a sidelink PC5 interface) on a common carrier shared between the first link and the second link. For example, the communication and processing circuitry 1041 and transceiver 1010, shown and described above in connection with FIG. 10, may provide a means to communicate with the base station and the second sidelink device on the common carrier.

At block 1104, the first wireless communication device may receive a grant from the base station including an indication of resources on the common carrier for the transmission of a superposition transmission including a base layer corresponding to an uplink signal to be transmitted to the base station and an enhanced layer corresponding to a sidelink signal to be transmitted to at least the second wireless communication device. In some examples, the sidelink signal may include a broadcast or groupcast signal that may be transmitted towards and/or received by two or more receiving wireless communication devices. In some examples, the first wireless communication device may receive the grant within DCI. The DCI may further include a respective MCS to utilize for each of the uplink signal and the sidelink signal. In addition, the DCI may include a power split factor (PSF) to be used between the base layer and the enhanced layer. In some examples, the first wireless communication device may further receive open loop power control parameters and closed loop power control parameters that may be used for the superposition transmission. For example, the open loop power control parameters may include one or more updated open loop power control parameters updated for the superposition transmission.

In some examples, the first wireless communication device may receive the grant in response to transmitting a scheduling request for the sidelink signal, transmitting respective scheduling requests for the sidelink signal and the uplink signal, or transmitting a scheduling request for the superposition transmission. In some examples, the first wireless communication device may further transmit an average sidelink path loss and an uplink path loss to the base station for use in determining the PSF. For example, the sidelink and/or uplink path loss may be transmitted together with the scheduling request(s). In some examples, the first wireless communication device may receive the grant in response to transmitting a capability indication to the base station indicating a capability of the first wireless communication device to perform the superposition transmission. For example, the communication and processing circuitry

1041 together with the transceiver 1010, shown and described above in connection with FIG. 10, may provide a means to receive the grant.

At block 1106, the first wireless communication device may transmit interference assistance information associated with the base layer to the second wireless communication device. In some examples, the interference assistance information may include the MCS of the uplink signal and the PSF. In some examples, the interference assistance information may be included within the sidelink control information (SCI) for the superposition transmission including the sidelink signal. The SCI may further include, for example, the MCS of the sidelink signal. In other examples, the interference assistance information may be transmitted separate from the SCI. For example, the interference cancellation circuitry 1044, together with the communication and processing circuitry 1041 and the transceiver 1010, shown and described above in connection with FIG. 10 may provide a means to transmit the interference assistance information to the second wireless communication device.

At block 1108, the first wireless communication device may transmit the superposition transmission including the base layer and the enhanced layer to the base station and the second wireless communication device. In some examples, the first wireless communication device may determine a total power budget based on the open/closed loop power control parameters. The first wireless communication device may then apply the PSF to the total power to generate the base layer at a first power and the enhanced layer at a second power. In some examples, the PSF may be multiplied by the total power budget to determine the first power. In addition, the total power budget may be multiplied by a difference between one and the PSF to determine the second power. In some examples, the first wireless communication device may generate the uplink signal utilizing the first MCS (selected by the base station for the uplink signal) at the first power to produce the base layer. In addition, the first wireless communication device may generate the sidelink signal utilizing the second MCS (selected by the base station for the sidelink signal) at the second power to produce the enhanced layer. The first wireless communication device may then superimpose the enhanced layer on the base layer to produce the superposition transmission. For example, the power split management circuitry 1043, together with the communication and processing circuitry 1041 and transceiver 1010, shown and described above in connection with FIG. 10 may provide a means to generate and transmit the superposition transmission.

Figure 12:
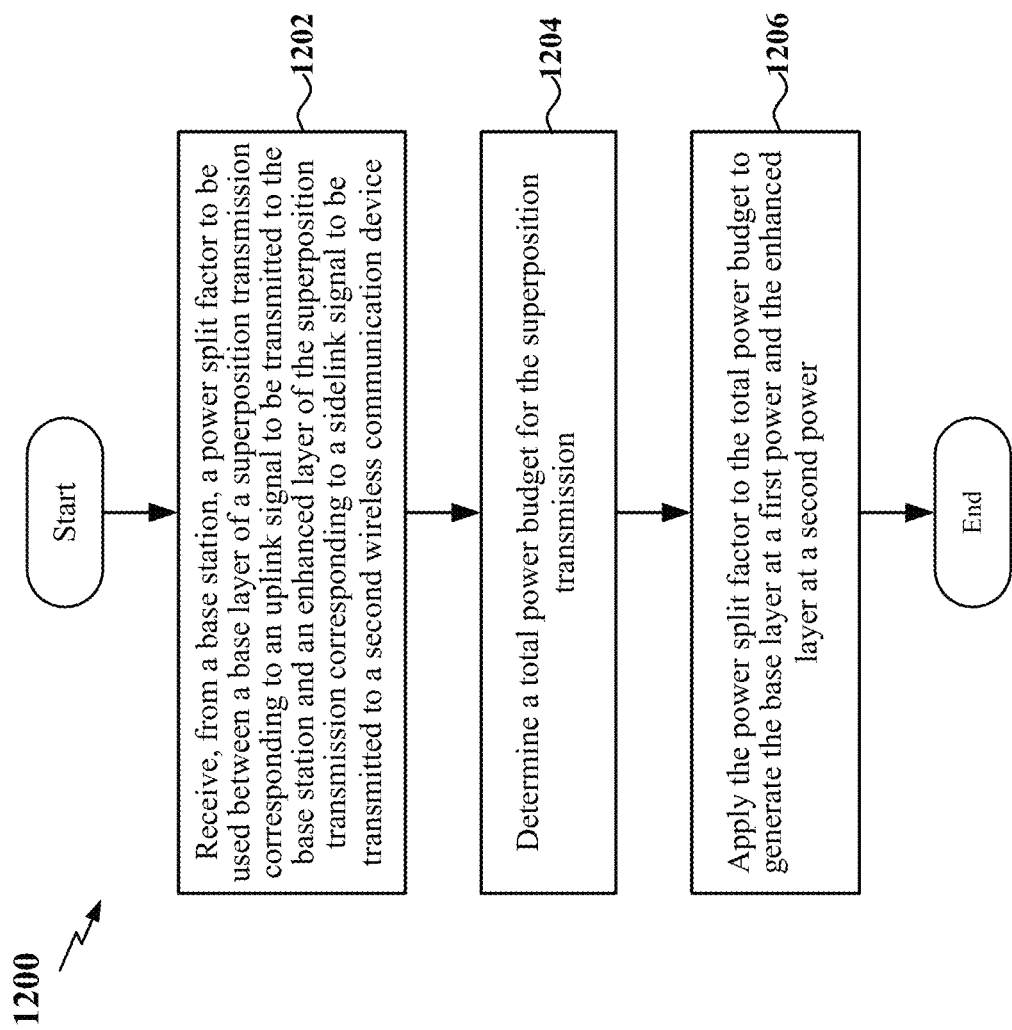
FIG. 12 is a flow chart of another exemplary method for a wireless communication device to generate and transmit a superposition transmission of an uplink signal and a sidelink signal according to some aspects.

FIG. 12 is a flow chart 1200 of another method for a wireless communication device to generate and transmit a superposition transmission of an uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1202, a first (e.g., transmitting) wireless communication device may receive, from a base station, a power split factor to be used between a base layer of a superposition transmission corresponding to an uplink signal to be transmitted to the base station and an enhanced layer of the superposition transmission corresponding to a sidelink signal to be transmitted to a second (e.g., receiving) wireless communication device. In some examples, the first wireless communication device may receive downlink control information (DCI) including the power split factor. For example, the communication and processing circuitry 1041 together with the transceiver 1010, shown and described above in connection with FIG. 10, may provide a means to receive the power split factor.

At block 1204, the first wireless communication device may determine a total power budget for the superposition transmission. In some examples, the first wireless communication device may receive, from the base station, closed loop power control parameters and open loop power control parameters for the superposition transmission. At least one of the open loop power control parameters may include an updated open loop power control parameter updated for the superposition transmission. The first wireless communication device may then determine the total power budget based on the closed loop power control parameters and the open loop power control parameters. For example, the power split management circuitry 1043 shown and described above in connection with FIG. 10 may provide a means to determine the total power budget.

Figure 13:
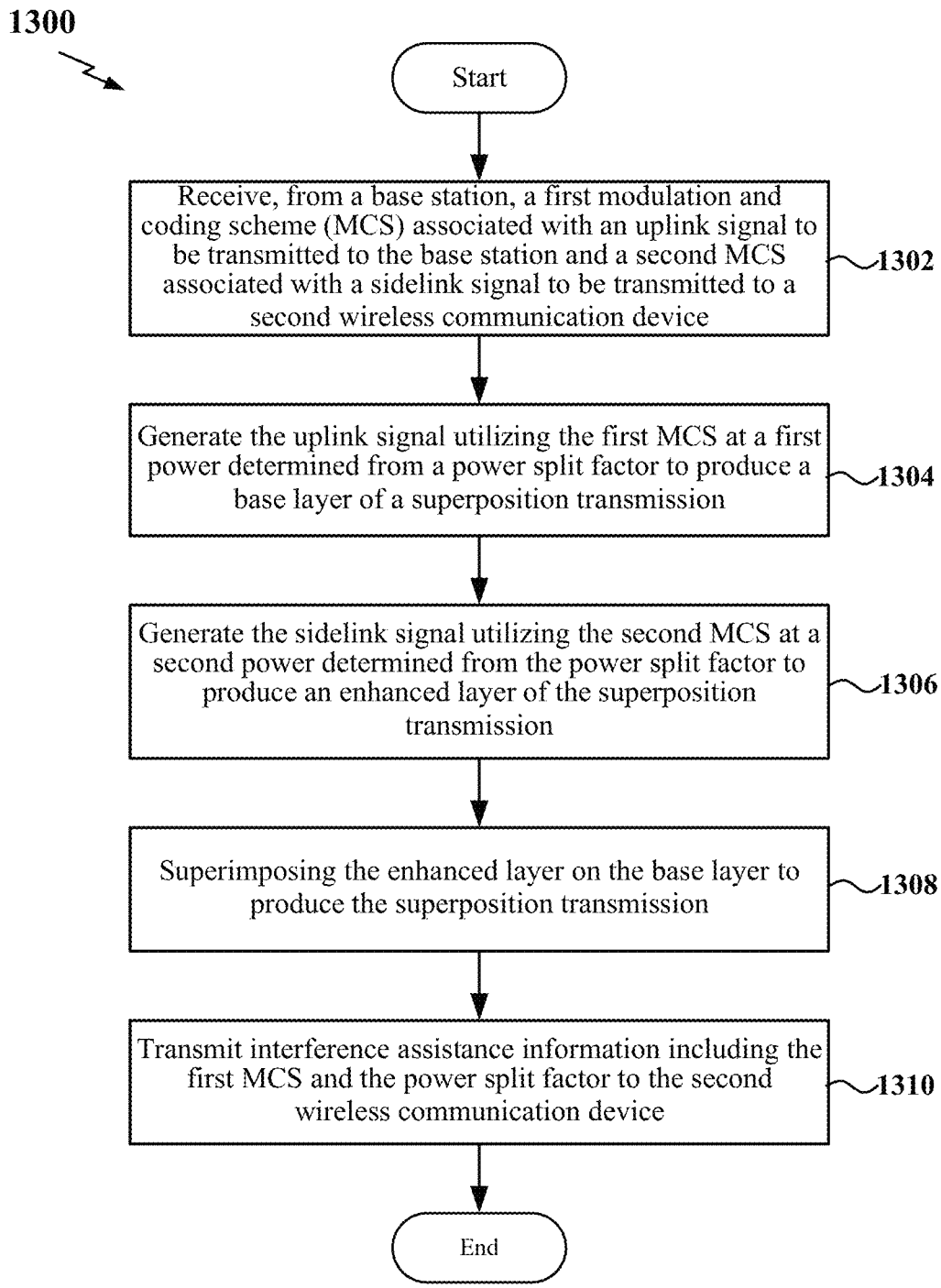
FIG. 13 is a flow chart of another exemplary method for a wireless communication device to generate and transmit a superposition transmission of an uplink signal and a sidelink signal according to some aspects.

At block 1206, the first wireless communication device may apply the power split factor to the total power budget to generate the base layer at a first power and the enhanced layer at a second power. In some examples, the first wireless communication device may multiply the power split factor by the total power budget to determine the first power at which to generate the base layer and multiply the total power budget by a difference between one and the power split factor to determine the second power at which to generate the enhanced layer. For example, the power split management circuitry 1043 shown and described above in connection with FIG. 10 may provide a means to apply the power split FIG. 13 is a flow chart 1300 of another method for a wireless communication device to generate and transmit a superposition transmission of an uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1302, a first (e.g., transmitting) wireless communication device may receive, from a base station, a first modulation and coding scheme (MCS) associated with an uplink signal to be transmitted to the base station and a second MCS associated with a sidelink signal to be transmitted to a second (e.g., receiving) wireless communication device. In some examples, the first wireless communication device may receive downlink control information (DCI) including at least the second MCS, a power split factor, and a grant of resources on a common carrier shared between the uplink signal and the sidelink signal for a superposition transmission of the uplink signal and the sidelink signal. For example, the communication and processing circuitry 1041 together with the transceiver 1010, shown and described above in connection with FIG. 10, may provide a means to receive the first MCS and the second MCS.

At block 1304, the first wireless communication device may generate the uplink signal utilizing the first MCS at a first power determined from a power split factor to produce a base layer of a superposition transmission. For example, the power split management circuitry 1043, together with the communication and processing circuitry 1041, shown and described above in connection with FIG. 10 may provide a means to generate the uplink signal utilizing the first MCS and the first power.

At block 1306, the first wireless communication device may generate the sidelink signal utilizing the second MCS at a second power determined from the power split factor to produce an enhanced layer of the superposition transmission. In some examples, the first wireless communication device may apply the power split factor to a total power budget for the superposition transmission to generate the base layer at the first power and the enhanced layer at the second power. For example, the first wireless communication device may multiply the power split factor by the total power budget to determine the first power at which to generate the base layer and multiply the total power budget by a difference between one and the power split factor to determine the second power at which to generate the enhanced layer. For example, the power split management circuitry 1043, together with the communication and processing circuitry 1041, shown and described above in connection with FIG. 10 may provide a means to generate the sidelink signal utilizing the second MCS and the second power level.

At block 1308, the first wireless communication device may superimpose the enhanced layer on the base layer to produce the superposition transmission. For example, the communication and processing circuitry 1041 shown and described above in connection with FIG. 10 may provide a means to superimpose the enhanced layer on the base layer to produce the superposition transmission.

At block 1310, the first wireless communication device may transmit interference assistance information including the first MCS and the power split factor to the second wireless communication device. In some examples, the first wireless communication device may transmit sidelink control information (SCI) including the interference assistance information and the second MCS to the second wireless communication. In some examples, the first wireless communication device may transmit the interference assistance information separate from sidelink control information including the second MCS to the second wireless communication device. For example, the communication and processing circuitry 1041 together with the transceiver 1010, shown and described above in connection with FIG. 10 may provide a means to transmit interference assistance information to the second wireless communication device.

Figure 14:
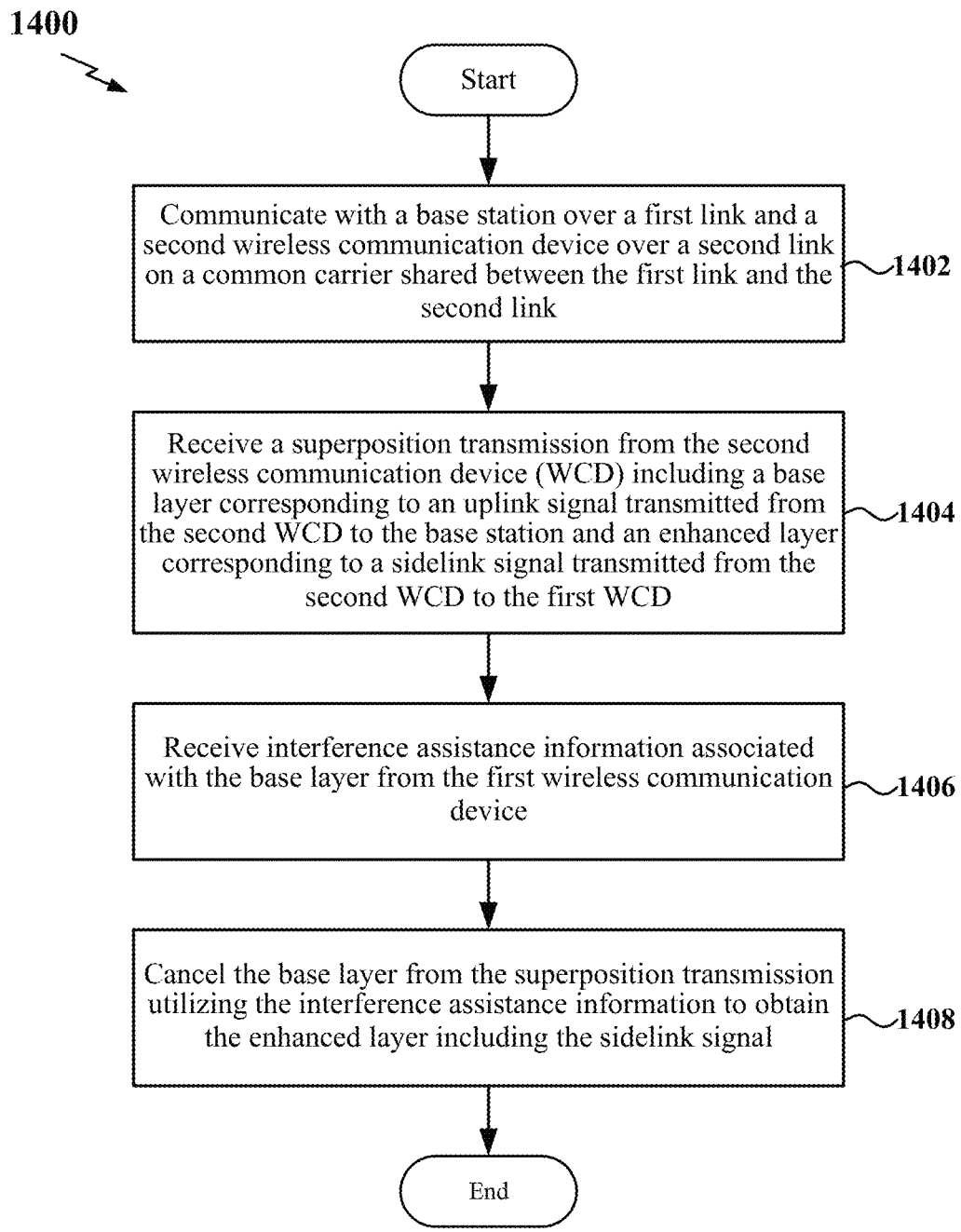
FIG. 14 is a flow chart of an exemplary method for a wireless communication device to receive a superposition transmission of an uplink signal and a sidelink signal according to some aspects.

FIG. 14 is a flow chart 1400 of a method for a wireless communication device to receive a superposition transmission of an uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1402, a first (e.g., transmitting) wireless communication device may communicate with a base station over a first link (e.g., Uu cellular interface) and a second sidelink device over a second link (e.g., a sidelink PC5 interface) on a common carrier shared between the first link and the second link. For example, the communication and processing circuitry 1041 and transceiver 1010, shown and described above in connection with FIG. 10, may provide a means to communicate with the base station and the second sidelink device on the common carrier.

At block 1404, the first wireless communication device may receive a superposition transmission from the second wireless communication device (WCD) including a base layer corresponding to an uplink signal transmitted from the second wireless communication device to the base station and an enhanced layer corresponding to a sidelink signal transmitted from the second wireless communication device to the first wireless communication device. The uplink signal may use a first MCS and be transmitted at a first power of a total power budget of the first communication device and the sidelink signal may use a second MCS and be transmitted at a second power of the total power budget. The first power and second power may be determined based on a power split factor (PSF) between the base layer and the enhancement layer. For example, the communication and processing circuitry 1041 together with the transceiver 1010 may provide a means to receive the superposition transmission.

At block 1406, the first wireless communication device may receive interference assistance information associated with the base layer from the first wireless communication device. In some examples, the interference assistance information may include the MCS of the uplink signal and the PSF indicating the first power of the base layer including the uplink signal and the second power of the enhanced layer including the sidelink signal. In some examples, the interference assistance information may be received within the sidelink control information (SCI) for the superposition transmission including the sidelink signal. The SCI may further include, for example, the MCS of the sidelink signal. In other examples, the interference assistance information may be received separate from the SCI. For example, the interference cancellation circuitry 1044, together with the communication and processing circuitry 1041 and the transceiver 1010, shown and described above in connection with FIG. 10 may provide a means to receive the interference assistance information from the second wireless communication device.

At block 1408, the first wireless communication device may cancel the base layer from the superposition transmission utilizing the interference assistance information to obtain the enhanced layer including the sidelink signal. For example, based on the first MCS of the uplink signal and PSF, the first wireless communication device may isolate the uplink signal and cancel the uplink signal from the received superposition transmission. For example, the interference cancellation circuitry 1044, together with the communication and processing circuitry 1041 may provide a means to cancel the base layer from the superposition transmission.

In one configuration, the wireless communication device 1000 includes means for superposition transmission communication as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Figure 15:
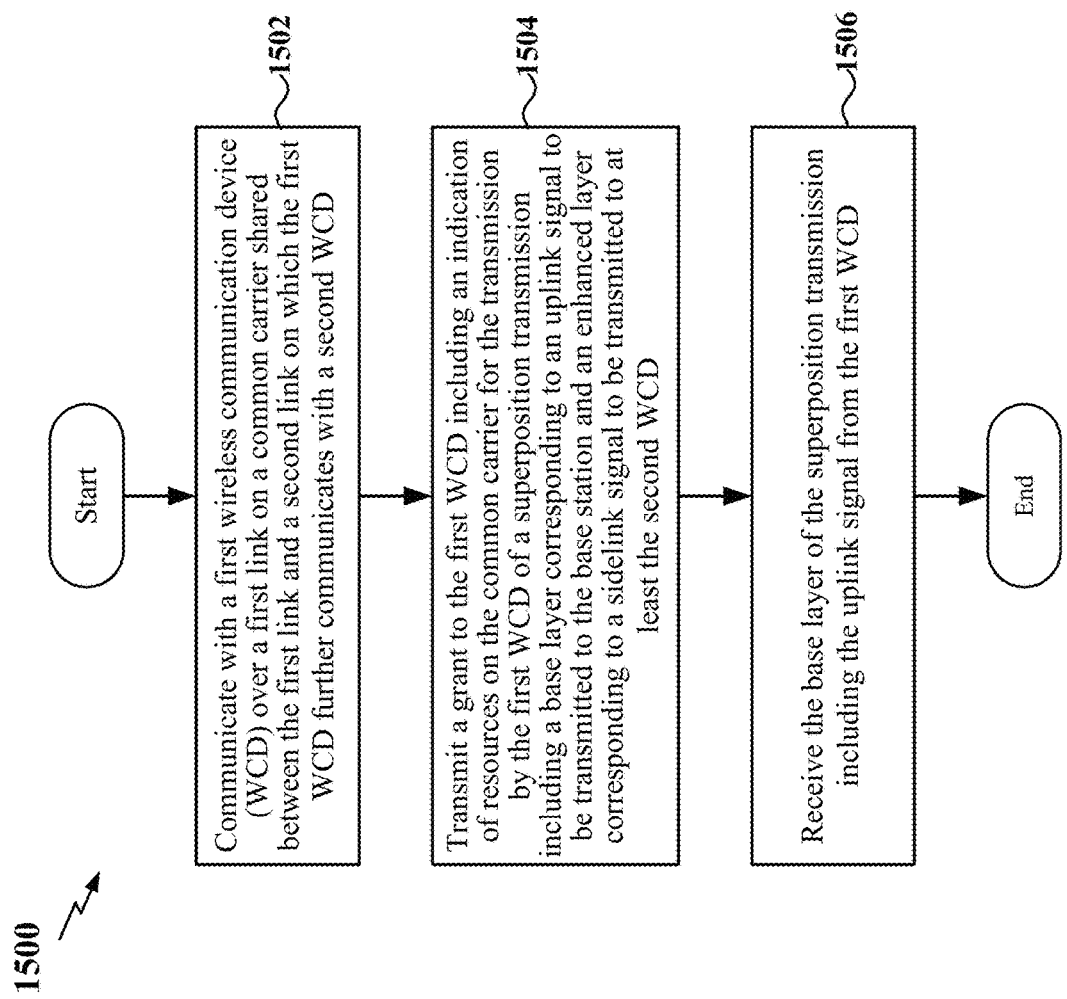
FIG. 15 is a flow chart of an exemplary method for a base station to receive an uplink signal of a superposition transmission including the uplink signal and a sidelink signal according to some aspects.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suit- FIG. 15 is a flow chart 1500 of an exemplary method for a base station to receive an uplink signal of a superposition transmission including the uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the base station 900, as described above and illustrated in FIG. 9, by a processor or processing system, or by any suitable means for carrying out the described functions.

At block 1502, the base station may communicate with a first wireless communication device (WCD) over a first link (e.g., Uu cellular interface) on a common carrier shared between the first link and a second link (e.g., sidelink PC5 interface) on which the first wireless communication device further communicates with a second wireless communication device. For example, the communication and processing circuitry 942 and transceiver 910, shown and described above in connection with FIG. 9, may provide a means to communicate with the first wireless communication device on the common carrier.

At block 1504, the base station may transmit a grant to the first wireless communication device including an indication of resources on the common carrier for the transmission by the first wireless communication device of a superposition transmission including a base layer corresponding to an uplink signal to be transmitted to the base station and an enhanced layer corresponding to a sidelink signal to be transmitted to at least the second wireless communication device. In some examples, the base station may further transmit a first MCS associated with the uplink signal and a second MCS associated with the sidelink signal. In some examples, the base station may further transmit a power split factor (PSF) to the first wireless communication device to be used by the first wireless communication device in splitting a total power budget of the first wireless communication device between a first power of the base layer and a second power of the enhanced layer. In some examples, the base station may transmit DCI including at least the grant, the second MCS, and the PSF.

In some examples, the base station may determine a first minimum power of the uplink signal at which the uplink signal can be decoded by the base station based on an uplink quality, determine a second minimum power of the sidelink signal at which the sidelink signal can be decoded by the second wireless communication device based on a sidelink quality, and identify the PSF based on the first minimum power and the second minimum power. In some examples, the base station may receive the uplink quality including a first path loss of the first link from the first wireless communication device and the sidelink quality including a second path loss associated with at least the second link from the first wireless communication device. For example, the base station may receive a scheduling request from the first wireless communication device requesting the grant for the superposition transmission. The scheduling request may further include the sidelink quality. In some examples, the scheduling request may further include at least one of a sidelink packet priority of the sidelink signal or a buffer status report.

In some examples, the base station may further transmit closed loop power control parameters and open loop power control parameters for the superposition transmission to the first wireless communication device for use by the first wireless communication device in determining the total power budget. In some examples, the base station may further receive a capability indication from the first wireless communication device indicating a capability of the first wireless communication device to perform the superposition transmission. For example, the superposition transmission determination circuitry 943, together with the communication and processing circuitry 942 and transceiver 910, shown and described above in connection with FIG. 9 may provide a means to transmit the grant for the superposition transmission to the first wireless communication device.

At 1506, the base station may receive the base layer of the superposition transmission including the uplink signal from the first WCD. For example, the base station may receive the base layer generated by the first wireless communication device at the first power. For example, the communication and processing circuitry 942 and transceiver 910, shown and described above in connection with FIG. 9 may provide a means to receive the base layer of the superposition transmission.

Figure 16:
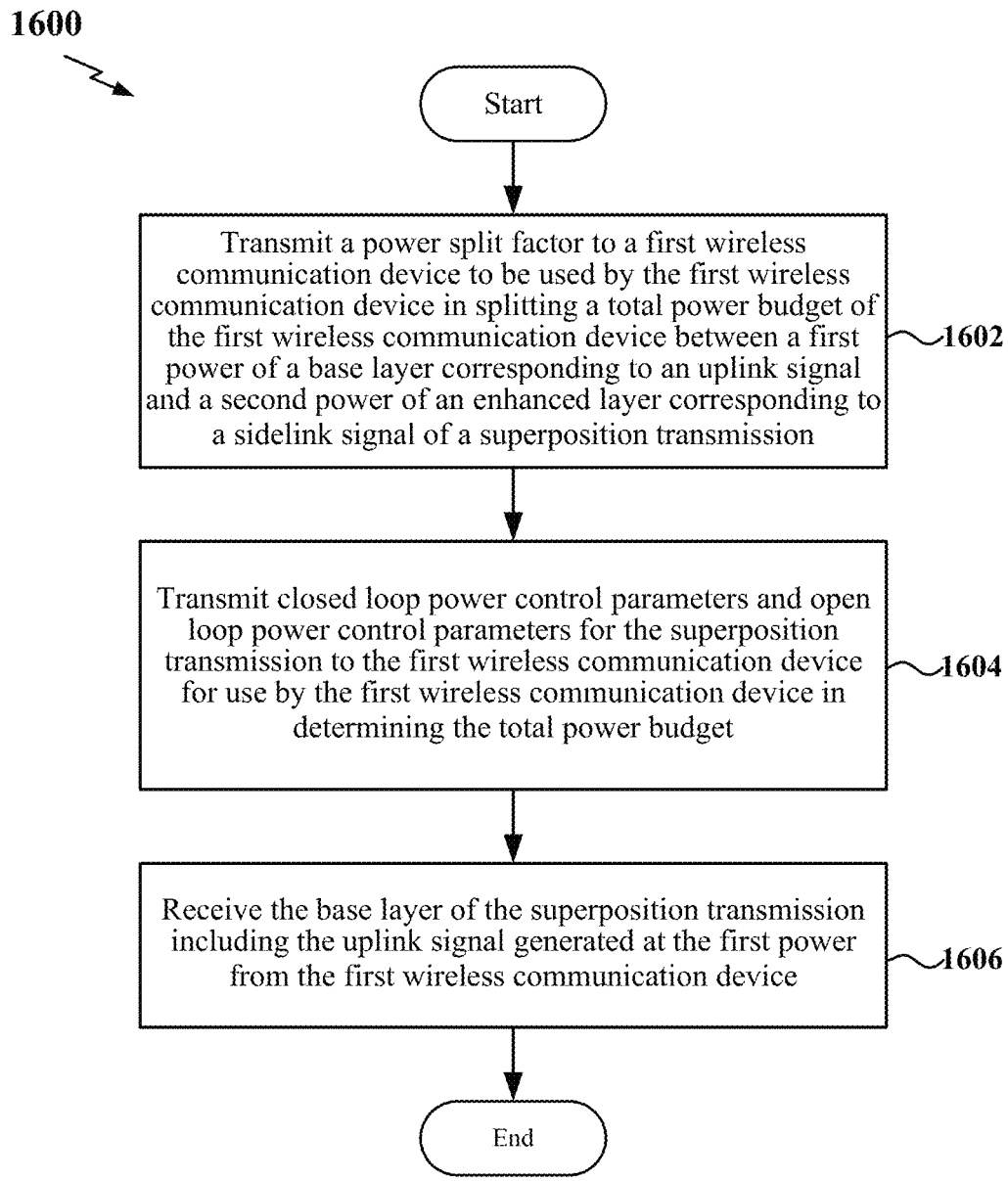
FIG. 16 is a flow chart of another exemplary method for a base station to receive an uplink signal of a superposition transmission including the uplink signal and a sidelink signal according to some aspects.

FIG. 16 is a flow chart 1600 of an exemplary method for a base station to receive an uplink signal of a superposition transmission including the uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the base station 900, as described above and illustrated in FIG. 9, by a processor or processing system, or by any suitable means for carrying out the described functions.

At block 1602, the base station may transmit a power split factor to a first wireless communication device to be used by the first wireless communication device in splitting a total power budget of the first wireless communication device between a first power of a base layer corresponding to an uplink signal and a second power of an enhanced layer corresponding to a sidelink signal of a superposition transmission. In some examples, the base station may further transmit a first modulation and coding scheme (MCS) associated with the uplink signal and a second MCS associated with the sidelink signal to the first wireless communication device. For example, the base station may transmit downlink control information including at least the second MCS, the power split factor, and a grant of resources on a common carrier shared between the uplink signal and the sidelink signal for a superposition transmission of the base layer and the enhanced layer. For example, the communication and processing circuitry 942, together with the transceiver 910, shown and described above in connection with FIG. 9 may provide a means to transmit the power split factor to the first wireless communication device.

At block 1604, the base station may transmit closed loop power control parameters and open loop power control parameters for the superposition transmission to the first wireless communication device for use by the first wireless communication device in determining the total power budget. For example, the communication and processing circuitry 942, together with the transceiver 910, shown and described above in connection with FIG. 9 may provide a means to transmit the closed loop power control parameters and the open loop power control parameters to the first wireless communication device.

At block 1606, the base station may receive the base layer of the superposition transmission including the uplink signal generated at the first power from the first wireless communication device. For example, the communication and processing circuitry 942, together with the transceiver 910, shown and described above in connection with FIG. 9 may provide a means to receive the base layer of the superposition transmission.

Figure 17:
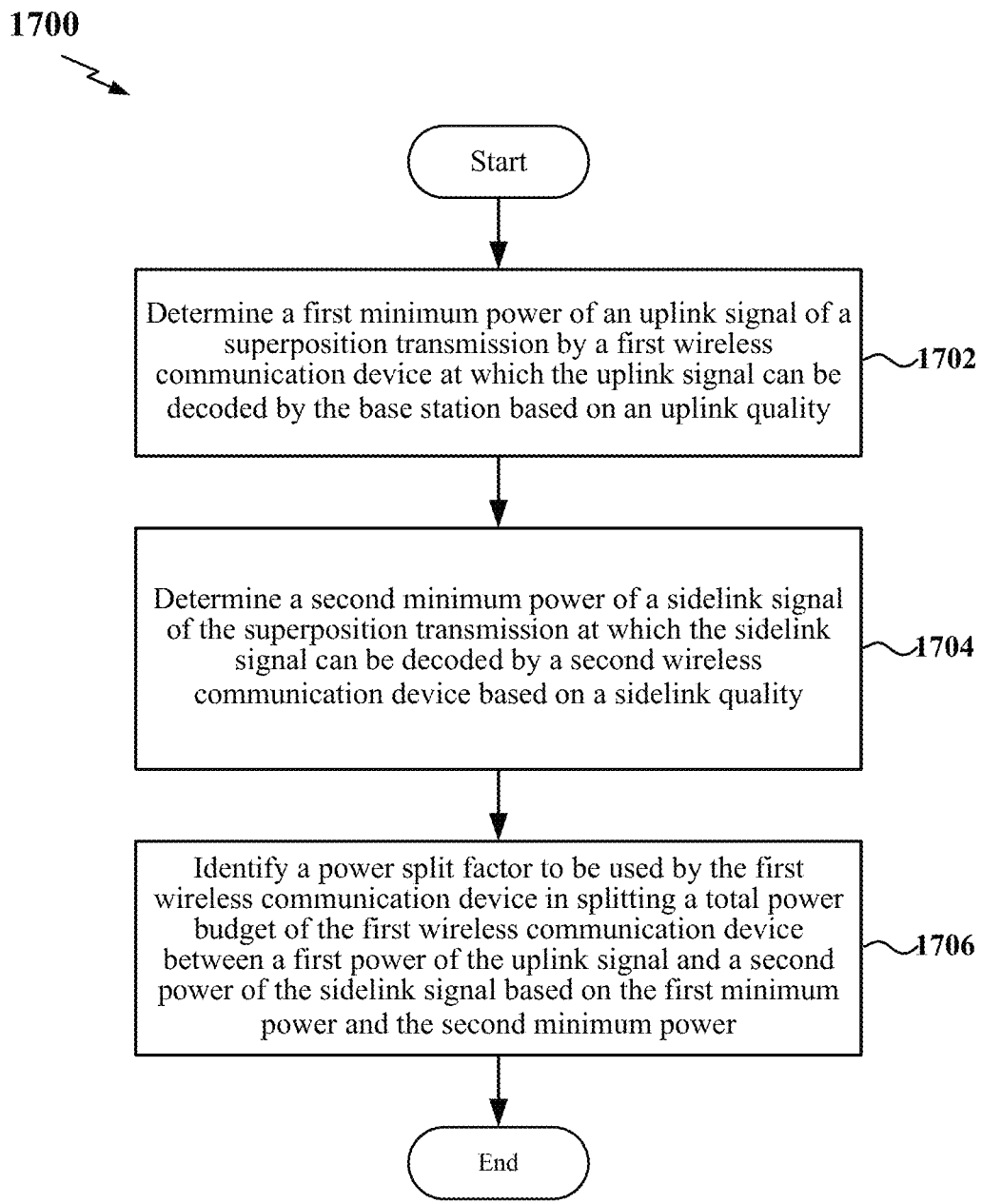
FIG. 17 is a flow chart of another exemplary method for a base station to receive an uplink signal of a superposition transmission including the uplink signal and a sidelink signal according to some aspects.

FIG. 17 is a flow chart 1700 of an exemplary method for a base station to receive an uplink signal of a superposition transmission including the uplink signal and a sidelink signal according to some aspects. As described below, some or all illustrated features may be omitted in a particular implementation within the scope of the present disclosure, and some illustrated features may not be required for implementation of all embodiments. In some examples, the method may be performed by the base station 900, as described above and illustrated in FIG. 9, by a processor or processing system, or by any suitable means for carrying out the described functions.

At block 1702, the base station may determine a first minimum power of an uplink signal of a superposition transmission by a first wireless communication device at which the uplink signal can be decoded by the base station based on an uplink quality. In some examples, the base station may receive, from the first wireless communication device, the uplink quality including a first path loss of a first link between the base station and the first wireless communication device. For example, the power determination circuitry 945 shown and described above in connection with FIG. 9 may provide a means to determine the first minimum power.

At block 1704, the base station may determine a second minimum power of a sidelink signal of the superposition transmission at which the sidelink signal can be decoded by a second wireless communication device based on a sidelink quality. In some examples, the base station may receive, from the first wireless communication device, the sidelink quality including a second path loss associated with at least a second link between the first wireless communication device and the second wireless communication device. In some examples, the base station may receive, from the first wireless communication device, a scheduling request requesting a grant for the superposition transmission and further including the sidelink quality. The scheduling request may further include at least one of a sidelink packet priority of the sidelink signal or a buffer status report. For example, the power determination circuitry 945 shown and described above in connection with FIG. 9 may provide a means to determine the second minimum power.

At block 1706, the base station may identify a power split factor to be used by the first wireless communication device in splitting a total power budget of the first wireless communication device between a first power of the uplink signal and a second power of the sidelink signal based on the first minimum power and the second minimum power. For example, the power determination circuitry 945 shown and described above in connection with FIG. 9 may provide a means to identify the power split factor.

In one configuration, the base station 900 includes means for superposition transmission communication as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 4, and utilizing, for example, the processes and/or algorithms described herein in relation to FIGS. 15-17.

The following provides an overview of examples of the present disclosure.

Example 1: A method of sidelink wireless communication at a first wireless communication device, the method comprising: communicating with a base station over a first link and a second wireless communication device over a second link on a common carrier shared between the first link and the second link; receiving a grant from the base station comprising an indication of resources on the common carrier for a superposition transmission comprising a base layer corresponding to an uplink signal to be transmitted to the base station and an enhanced layer corresponding to a sidelink signal to be transmitted to at least the second wireless communication device; transmitting interference assistance information associated with the base layer to the second wireless communication device; and transmitting the superposition transmission comprising the base layer and the enhanced layer to the base station and the second wireless communication device.

Example 2: The method of example 1, further comprising: receiving a power split factor to be used between the base layer and the enhanced layer; determining a total power budget for the superposition transmission; and applying the power split factor to the total power budget to generate the base layer at a first power and the enhanced layer at a second power.

Example 3: The method of example 2, wherein the applying the power split factor further comprises: multiplying the power split factor by the total power budget to determine the first power at which to generate the base layer; and multiplying the total power budget by a difference between one and the power split factor to determine the second power at which to generate the enhanced layer.

Example 4: The method of example 2 or 3, further comprising: receiving closed loop power control parameters and open loop power control parameters for the superposition transmission, wherein at least one of the open loop power control parameters comprises an updated open loop power control parameter updated for the superposition transmission; and determining the total power budget based on the closed loop power control parameters and the open loop power control parameters.

Example 5: The method of any of examples 2 through 4, further comprising: receiving a first modulation and coding scheme (MCS) associated with the uplink signal and a second MCS associated with the sidelink signal from the base station; generating the uplink signal utilizing the first MCS at the first power to produce the base layer; generating the sidelink signal utilizing the second MCS at the second power to produce the enhanced layer; and superimposing the enhanced layer on the base layer to produce the superposition transmission.

Example 6: The method of example 5, wherein the transmitting the interference assistance information further comprises: transmitting the interference assistance information comprising the first MCS and the power split factor to the second wireless communication device.

Example 7: The method of example 6, wherein the transmitting the interference assistance information further comprises: transmitting sidelink control information (SCI) comprising the interference assistance information and the second MCS to the second wireless communication device.

Example 8: The method of example 6, wherein the transmitting the interference assistance information further comprises: transmitting the interference assistance information separate from sidelink control information comprising the second MCS to the second wireless communication device.

Example 9: The method of any of examples 5 through 8, wherein the receiving the grant further comprises: receiving downlink control information comprising at least the grant, the second MCS, and the power split factor.

Example 10: The method of any of examples 1 through 9, further comprising: transmitting a capability indication to the base station indicating a capability of the first wireless communication device to perform the superposition transmission.

Example 11: The method of any of examples 1 through 10, further comprising: transmitting a scheduling request to the base station requesting the grant for the superposition transmission.

Example 12: The method of example 11, wherein the transmitting the scheduling request further comprises: transmitting the scheduling request comprising at least one of a sidelink packet priority of the sidelink signal, a buffer status report, or a sidelink quality.

Example 13: The method of example 12, further comprising: measuring an average sidelink path loss associated with the second link over a window of time, wherein the sidelink quality comprises the average sidelink path loss.

Example 14: The method of any of examples 1 through 13, wherein the sidelink signal comprises a broadcast sidelink signal broadcast to a plurality of sidelink devices comprising the second wireless communication device.

Example 15: A method of sidelink wireless communication at a first wireless communication device, the method comprising: communicating with a base station over a first link and a second wireless communication device over a second link on a common carrier shared between the first link and the second link; receiving a superposition transmission from the second wireless communication device comprising a base layer corresponding to an uplink signal transmitted from the second wireless communication device to the base station and an enhanced layer corresponding to a sidelink signal transmitted from the second wireless communication device to the first wireless communication device; receiving interference assistance information associated with the base layer from the second wireless communication device; and canceling the base layer from the superposition transmission utilizing the interference assistance information to obtain the enhanced layer comprising the sidelink signal.

Example 16: The method of claim 15, wherein the receiving the interference assistance information further comprises: receiving the interference assistance information comprising a first modulation and coding scheme (MCS) of the uplink signal and a power split factor indicating a first power of the base layer comprising the uplink signal and a second power of the enhanced layer comprising the sidelink signal.

Example 17: The method of example 16, wherein the receiving the interference assistance information further comprises: receiving sidelink control information (SCI) comprising the interference assistance information and a second MCS of the sidelink signal from the second wireless communication device.

Example 18: The method of example 16, wherein the receiving the interference assistance information further comprises: receiving the interference assistance information separate from sidelink control information comprising a second MCS of the sidelink signal from the second wireless communication device.

Example 19: A method of wireless communication at a base station, the method comprising: communicating with a first wireless communication device over a first link on a common carrier shared between the first link and a second link on which the first wireless communication device further communicates with a second wireless communication device; transmitting a grant to the first wireless communication device comprising an indication of resources on the common carrier for a superposition transmission comprising a base layer corresponding to an uplink signal to be transmitted from the first wireless communication device to the base station and an enhanced layer corresponding to a sidelink signal to be transmitted from the first wireless communication device to at least the second wireless communication device; and receiving the base layer of the superposition transmission comprising the uplink signal from the first wireless communication device.

Example 20: The method of example 19, further comprising: transmitting a power split factor to the first wireless communication device to be used by the first wireless communication device in splitting a total power budget of the first wireless communication device between a first power of the base layer and a second power of the enhanced layer.

Example 21: The method of example 20, wherein the receiving the base layer of the superposition transmission further comprises: receiving the base layer generated by the first wireless communication device at the first power.

Example 22: The method of example 20 or 21, further comprising: transmitting closed loop power control parameters and open loop power control parameters for the superposition transmission to the first wireless communication device for use by the first wireless communication device in determining the total power budget.

Example 23: The method of any of examples 20 through 22, further comprising: determining a first minimum power of the uplink signal at which the uplink signal can be decoded by the base station based on an uplink quality; determining a second minimum power of the sidelink signal at which the sidelink signal can be decoded by the second wireless communication device based on a sidelink quality; and identifying the power split factor based on the first minimum power and the second minimum power.

Example 24: The method of example 23, further comprising: receiving the uplink quality comprising a first path loss of the first link from the first wireless communication device; and receiving the sidelink quality comprising a second path loss associated with at least the second link from the first wireless communication device.

Example 25: The method of example 24, further comprising: receiving a scheduling request from the first wireless communication device requesting the grant for the superposition transmission, wherein the scheduling request further comprises the sidelink quality.

Example 26: The method of example 25, wherein the scheduling request further comprises at least one of a sidelink packet priority of the sidelink signal or a buffer status report.

Example 27: The method of any of examples 20 through 26, further comprising: transmitting a first modulation and coding scheme (MCS) associated with the uplink signal and a second MCS associated with the sidelink signal to the first wireless communication device.

Example 28: The method of example 27, wherein the transmitting the grant further comprises: transmitting downlink control information comprising at least the grant, the second MCS, and the power split factor.

Example 29: The method of any of examples 19 through 28, further comprising: receiving a capability indication from the first wireless communication device indicating a capability of the first wireless communication device to perform the superposition transmission.

Example 30: A first sidelink device in a wireless communication network comprising a wireless transceiver, a memory, and processor coupled to the wireless transceiver and the memory, the processor and memory configured to perform a method of any one of examples 1 through 18.

Example 31: A first sidelink device in a wireless communication network comprising at least one means for performing a method of any one of examples 1 through 18.

Example 32: An article of manufacture for use by a first sidelink device in a wireless communication network comprising a non-transitory computer-readable medium having stored therein instructions executable by one or more processors of the first sidelink device to perform a method of any one of examples 1 through 18.

Example 33: A base station in a wireless communication network comprising a wireless transceiver, a memory, and processor coupled to the wireless transceiver and the memory, the processor and memory configured to perform a method of any one of examples 19 through 29.

Example 34: A base station in a wireless communication network comprising at least one means for performing a method of any one of examples 19 through 29.

Example 35: An article of manufacture for use by a base station in a wireless communication network comprising a non-transitory computer-readable medium having stored therein instructions executable by one or more processors of the base station to perform a method of any one of examples 19 through 29.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, and 7-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of sidelink wireless communication at a first wireless communication device, the method comprising:
    communicating with a base station over a first link and a second wireless communication device over a second link on a common carrier shared between the first link and the second link;
    receiving a grant from the base station comprising an indication of resources on the common carrier for a superposition transmission comprising a base layer corresponding to an uplink signal to be transmitted to the base station and an enhanced layer corresponding to a sidelink signal to be transmitted to at least the second wireless communication device, wherein the grant is included within downlink control information (DCI) received from the base station;
    transmitting interference assistance information associated with the base layer to the second wireless communication device, the interference assistance information comprising a first modulation and coding scheme (MCS) used for the uplink signal, wherein the first MCS is included within the DCI; and
    transmitting the superposition transmission comprising the base layer and the enhanced layer to the base station and the second wireless communication device based on a power split factor included within the DCI.

2. The method of claim 1, further comprising:
    determining a total power budget for the superposition transmission; and
    applying the power split factor to the total power budget to generate the base layer at a first power and the enhanced layer at a second power.

3. The method of claim 2, wherein the applying the power split factor further comprises:
    multiplying the power split factor by the total power budget to determine the first power at which to generate the base layer; and
    multiplying the total power budget by a difference between one and the power split factor to determine the second power at which to generate the enhanced layer.

4. The method of claim 2, further comprising:
    receiving closed loop power control parameters and open loop power control parameters for the superposition transmission, wherein at least one of the open loop power control parameters comprises an updated open loop power control parameter updated for the superposition transmission; and
    determining the total power budget based on the closed loop power control parameters and the open loop power control parameters.

5. The method of claim 2, further comprising:
    receiving a second MCS associated with the sidelink signal from the base station;
    generating the uplink signal utilizing the first MCS at the first power to produce the base layer;
    generating the sidelink signal utilizing the second MCS at the second power to produce the enhanced layer; and
    superimposing the enhanced layer on the base layer to produce the superposition transmission.

6. The method of claim 5, wherein the transmitting the interference assistance information further comprises:
    transmitting the interference assistance information comprising the first MCS and the power split factor to the second wireless communication device.

7. The method of claim 6, wherein the transmitting the interference assistance information further comprises:
    transmitting sidelink control information (SCI) comprising the interference assistance information and the second MCS to the second wireless communication device.

8. The method of claim 6, wherein the transmitting the interference assistance information further comprises:
    transmitting the interference assistance information separate from sidelink control information comprising the second MCS to the second wireless communication device.

9. The method of claim 5, wherein the second MCS is included within the DCI.

10. The method of claim 1, further comprising:
    transmitting a capability indication to the base station indicating a capability of the first wireless communication device to perform the superposition transmission.

11. The method of claim 1, further comprising:
    transmitting a scheduling request to the base station requesting the grant for the superposition transmission.

12. The method of claim 11, wherein the transmitting the scheduling request further comprises:
    transmitting the scheduling request comprising at least one of a sidelink packet priority of the sidelink signal, a buffer status report, or a sidelink quality.

13. The method of claim 12, further comprising:
    measuring an average sidelink path loss associated with the second link over a window of time, wherein the sidelink quality comprises the average sidelink path loss.

14. The method of claim 1, wherein the sidelink signal comprises a broadcast sidelink signal broadcast to a plurality of sidelink devices comprising the second wireless communication device.

15. A first wireless communication device in a wireless communication network, comprising:
    a wireless transceiver;
    a memory; and
    a processor coupled to the wireless transceiver and the memory, wherein the processor is configured to:
        communicate with a base station over a first link and a second wireless communication device over a second link on a common carrier shared between the first link and the second link via the wireless transceiver;
        receive a grant from the base station comprising an indication of resources on the common carrier for a superposition transmission comprising a base layer corresponding to an uplink signal to be transmitted to the base station and an enhanced layer corresponding to a sidelink signal to be transmitted to at least the second wireless communication device, wherein the grant is included within downlink control information (DCI) received from the base station;
        transmit interference assistance information associated with the base layer to the second wireless communication device via the wireless transceiver, the interference assistance information comprising a first modulation and coding scheme (MCS) used for the uplink signal, wherein the first MCS is included within the DCI; and
        transmit the superposition transmission comprising the base layer and the enhanced layer to the base station and the second wireless communication device via the wireless transceiver based on a power split factor included within the DCI.

16. The first wireless communication device of claim 15, wherein the processor is further configured to:
   determine a total power budget for the superposition transmission; and
   apply the power split factor to the total power budget to generate the base layer at a first power and the enhanced layer at a second power.

17. The first wireless communication device of claim 16, wherein the processor is further configured to:
   multiply the power split factor by the total power budget to determine the first power at which to generate the base layer; and
   multiply the total power budget by a difference between one and the power split factor to determine the second power at which to generate the enhanced layer.

18. The first wireless communication device of claim 16, wherein the processor is further configured to:
   receive closed loop power control parameters and open loop power control parameters for the superposition transmission, wherein at least one of the open loop power control parameters comprises an updated open loop power control parameter updated for the superposition transmission; and
   determine the total power budget based on the closed loop power control parameters and the open loop power control parameters.

19. The first wireless communication device of claim 16, wherein the processor is further configured to:
   receiving a second MCS associated with the sidelink signal from the base station;
   generating the uplink signal utilizing the first MCS at the first power to produce the base layer;
   generating the sidelink signal utilizing the second MCS at the second power to produce the enhanced layer; and
   superimposing the enhanced layer on the base layer to produce the superposition transmission.

20. The first wireless communication device of claim 19, wherein the processor is further configured to:
   transmit the interference assistance information comprising the first MCS and the power split factor to the second wireless communication device.

21. The first wireless communication device of claim 20, wherein the processor is further configured to:
   transmit sidelink control information (SCI) comprising the interference assistance information and the second MCS to the second wireless communication device.

22. The first wireless communication device of claim 20, wherein the processor is further configured to:
   transmit the interference assistance information separate from sidelink control information comprising the second MCS to the second wireless communication device.

23. The first wireless communication device of claim 19, wherein the second MCS is included within the DCI.

* * * * *